United States Patent [19]
Nin

[11] Patent Number: 5,748,195
[45] Date of Patent: May 5, 1998

[54] METHOD AND MEANS FOR EVALUATING A TETRAHEDRAL LINEAR INTERPOLATION FUNCTION

[75] Inventor: Sigfredo Isamael Nin, Morgan Hill, Calif.

[73] Assignee: International Business Machines Corporation, Armonk, N.Y.

[21] Appl. No.: 516,732

[22] Filed: Aug. 18, 1995

Related U.S. Application Data

[63] Continuation of Ser. No. 968,643, Oct. 29, 1992, abandoned.

[51] Int. Cl.$^6$ ........................................................ G06T 5/00
[52] U.S. Cl. ............................ 345/431; 345/153; 358/523
[58] Field of Search ................................. 395/123, 131; 345/153, 154; 358/523, 518, 519, 524

[56] References Cited

U.S. PATENT DOCUMENTS

| | | | |
|---|---|---|---|
| 4,075,663 | 2/1978 | Wellendorf | 358/283 |
| 4,275,413 | 6/1981 | Sakamoto et al. | 358/80 |
| 4,334,240 | 6/1982 | Franklin | 358/78 |
| 4,350,996 | 9/1982 | Rosenfeld | 358/75 |
| 4,456,924 | 6/1984 | Rosenfeld | 358/75 |
| 4,462,083 | 7/1984 | Schwefel | 364/577 |
| 4,463,374 | 7/1984 | Thompson | 358/78 |
| 4,464,677 | 8/1984 | Kuhn et al. | 358/75 |
| 4,468,693 | 8/1984 | Fujita et al. | 358/78 |
| 4,477,833 | 10/1984 | Clark et al. | 358/80 |
| 4,500,919 | 2/1985 | Schreiber | 358/78 |
| 4,511,989 | 4/1985 | Sakamoto | 364/723 |
| 4,561,016 | 12/1985 | Jung et al. | 358/76 |
| 4,639,770 | 1/1987 | Jung et al. | 358/76 |
| 4,670,780 | 6/1987 | McManus et al. | 358/80 |
| 4,717,954 | 1/1988 | Fujita et al. | 358/80 |

(List continued on next page.)

FOREIGN PATENT DOCUMENTS

| | | |
|---|---|---|
| 1595122 | 8/1981 | Japan . |
| 2-206973 | 2/1990 | Japan . |
| 2-226869 | 2/1990 | Japan . |
| 9-89-513 | 3/1991 | Japan ................................. 265/309 |

OTHER PUBLICATIONS

"Color Correction Technique for Hard Copies by 4–Neighbors Interpolation Method", Kanamori et al..

"The Gamut of Real Surface Colours", M.R. Pointer, Research Division, Kodak Limited, Color Research Application, vol. 5, No. 3, Fall 1980, pp. 145–155.

"A Novel Color Transformation Algorithm And It's Application" by Katsuhiro et.; Image Processing Algorithm and Tech.; vol. 1244; 1990.

*Primary Examiner*—Mark K. Zimmerman
*Attorney, Agent, or Firm*—Baker, Maxham, Jester & Meador

[57] ABSTRACT

A method of evaluating a tetrahedral linear interpolation function utilizes a table preparation process and a linear interpolating process. In the table preparation process, values v and domain points p of the function are related by two tetrahedral interpolation variables denoted as a matrix T and a vector t, as follows: v=t+pT. The coordinates of p include n components, and the value v includes m components. The matrix T includes n rows and m columns, as it must to relate p to v. If the value of the function is scalar, t is also a scalar, and T is a vector of n elements. From the coordinates of the (n+1) domain input points and the function values v at these points, the values of variables t and T are computed and stored in a table. The linear interpolation procedure of the invention uses the values tabulated for t and T to calculate an approximation for the components of the function value v at a given p. The function arguments are stored in a first array of n elements denoted as p[i], and the calculated approximations are to be stored in a second array of m elements denoted as v[j]. The approximations for the array v[j] may be calculated according to the following equation:

$$v[j] = k[n,j] + \sum_{i=0}^{(n-1)} p[i] \times k[i,j] \text{ for } j = 0 \text{ to } m-1.$$

2 Claims, 16 Drawing Sheets

U.S. PATENT DOCUMENTS

| | | | |
|---|---|---|---|
| 4,729,098 | 3/1988 | Cline et al. | 364/414 |
| 4,751,742 | 6/1988 | Meeker | 382/41 |
| 4,758,885 | 7/1988 | Sasaki et al. | 358/80 |
| 4,780,756 | 10/1988 | Shiota et al. | 358/78 |
| 4,805,013 | 2/1989 | Dei et al. | 358/80 |
| 4,829,587 | 5/1989 | Glazer et al. | 382/47 |
| 4,837,613 | 6/1989 | Paxton et al. | 358/75 |
| 4,837,722 | 6/1989 | Sara | 364/723 |
| 4,839,721 | 6/1989 | Abdulwahab et al. | 358/518 |
| 4,839,722 | 6/1989 | Barry et al. | 358/80 |
| 4,862,255 | 8/1989 | Takanaski et al. | 358/80 |
| 4,864,357 | 9/1989 | Matsunawa et al. | 355/32 |
| 4,876,509 | 10/1989 | Perlmutter | 324/309 |
| 4,879,594 | 11/1989 | Stansfield et al. | 358/80 |
| 4,893,181 | 1/1990 | Yeomans | 358/80 |
| 4,894,794 | 1/1990 | Shenk | 364/723 |
| 4,901,258 | 2/1990 | Akiyama | 364/577 |
| 4,941,038 | 7/1990 | Walowit | 358/80 |
| 4,941,039 | 7/1990 | E'Errico | 358/80 |
| 4,945,500 | 7/1990 | Deering | 364/522 |
| 4,959,711 | 9/1990 | Hung et al. | 358/80 |
| 4,972,329 | 11/1990 | Breger | 364/529 |
| 4,974,069 | 11/1990 | Shimomura | 358/75 |
| 4,992,861 | 2/1991 | D'Errico | 358/75 |
| 4,992,862 | 2/1991 | Gabor | 358/76 |
| 5,001,651 | 3/1991 | Rehme et al. | 364/518 |
| 5,025,404 | 6/1991 | Jannssen et al. | 364/723 |
| 5,025,405 | 6/1991 | Swanson | 364/723 |
| 5,054,097 | 10/1991 | Flinois et al. | 382/44 |
| 5,055,923 | 10/1991 | Kitagawa et al. | 358/75 |
| 5,072,305 | 12/1991 | Numakura et al. | 358/298 |
| 5,077,604 | 12/1991 | Kivolowitz et al. | 358/75 |
| 5,097,518 | 3/1992 | Scott et al. | 382/47 |
| 5,101,283 | 3/1992 | Seki et al. | 358/456 |
| 5,111,286 | 5/1992 | MacDonald et al. | 358/75 |
| 5,146,328 | 9/1992 | Yamasaki et al. | 358/519 X |
| 5,218,671 | 6/1993 | Liao et al. | 395/131 |
| 5,225,817 | 7/1993 | Long | 345/153 |
| 5,227,863 | 7/1993 | Bilbrey et al. | 348/578 |
| 5,243,414 | 9/1993 | Dalrymple et al. | 358/518 X |
| 5,287,127 | 2/1994 | Salmon | 347/158 |
| 5,289,565 | 2/1994 | Smith et al. | 395/131 |
| 5,329,385 | 7/1994 | Washio | 358/523 X |

5,748,195

METHOD AND MEANS FOR EVALUATING A TETRAHEDRAL LINEAR INTERPOLATION FUNCTION

This application is a file wrapper continuation of application Ser. No. 07/968,643, filed Oct. 29, 1992, now abandoned.

BACKGROUND OF THE INVENTION

1. Field of the Invention

This invention relates generally to methods for evaluating mathematical functions of many variables, and more specifically to a tetrahedral linear interpolation method for approximating the value of a continuous multivariable function.

2. Description of the Prior Art

Many modern-day industrial processes require the evaluation of one or more mathematical functions. These functions frequently involve a multiplicity of variables interrelated by relatively complex mathematical expressions. Oftentimes, the overall efficiency of a process is determined by the relative ease or difficulty with which a function may be evaluated. For instance, in the field of color imaging, it is often desired to convert a color image from a first color space to a second color space. The first color space may be a pixel by pixel image representation stored in a computer file, and the second color space may be a color image created on paper by means of printer inks.

During the implementation of a process, it is generally more important to provide an efficient function evaluation technique, as opposed to providing a function evaluation technique optimized for maximum accuracy. For example, during the process of color image conversion, a quick, expedient evaluation of color image functions is much more important than a completely accurate representation of the converted color image. Efficiency is of paramount importance in this context because a common design goal of many image processing systems is to provide real-time processing capability. Accuracy is not a critical design parameter because the human eye can compensate for minor imaging errors. The characteristics of human visual perception generally allow for the existence of a known bounded error in image rendering. Although the importance of efficiency relative to accuracy has been described in conjunction with color imaging systems, a similar situation exists across a broad spectrum of other process applications as well.

In some process applications, the output of a function may be sampled, but the function itself is unknown. For example, consider the conversion of an image from the color space of a computer file to the surface of a newspaper. The actual colors produced by the printing ink interacting with the paper are difficult or impossible to accurately quantize. The factors resulting in the appearance of a given color on paper are represented by an unknown function, even though the value of the function can be sampled at various intervals. In this scenario, an accurate representation of the imaging information is not at all critical, and emphasis may instead be placed on data processing speed.

Many existing processes involve mathematical functions having extensive domains. It is generally impractical to sample the output of the function at all possible domain values. For example, FIG. 1 illustrates the domain of a mathematical function representing the color of an object in the context of a color image processing system. State of the art color imaging systems represent a color image as a regular array of spots, generally referred to as pixels. Each pixel is assigned a color represented by the coordinates of the color in a three dimensional space. In an additive color environment (i. e., a cathode-ray tube display), any color may be represented by a given combination of the three primary colors of red, green, and blue. The value of red may be represented, for example, along the X axis, green along the Y axis, and blue along the Z axis. Each coordinate may be of arbitrary precision, but coordinates are generally represented using 8-bit values. In this manner, each pixel may be assigned one of $2^{24}$ different colors. Therefore, the domain of the mathematical function representing pixel color is quite extensive.

The mathematical function accepts input values within the domain of the function, and produces output values corresponding to the input values. The sequence of mathematical operations carried out by the function is determined by the process to be implemented. To print a color image displayed on a cathode-ray tube, the image must be converted from additive to subtractive form. As previously described, the cathode-ray tube image is stored as a pixel-by-pixel representation specifying particular quantities of the colors red, green, and blue. For subtractive color applications, such as printing, the three primary colors are magenta, yellow, and cyan (blue-green). In printing, the range of colors that can be realized is often extended by using black. Accordingly, a function must be determined for the purpose of converting pixel color representations into known quantities of colored printer inks, typically with the amount expressed as an integer in the range of 0 to 255 for each of cyan, yellow, magenta, and black. The function accepts input values for the variables red, green and blue, and produces output values which represent quantities of magenta, yellow, cyan and black.

For many processes, it is highly impractical to define a function in analytical form. In the context of color image conversion, it would be very difficult to develop a working analytical model for the purpose of converting a cathode-ray tube image representation into a form suitable for color printing on newspaper media. If the printer inks offered a perfectly linear response, and if the paper was perfectly white, then the function for the conversion of the color image could be specified analytically. However, as a practical matter, the inks have a nonlinear response, and the paper is off-white. Consequently, the print function is best represented by using measurements accumulated form a plurality of print samples. There are $2^{24}$ points in the function domain which could be sampled, so it would be prohibitively time-consuming to measure and store all of these values. Rather, the function may be approximated using a smaller set of measured values (sample points), and using interpolation to compute the approximate values for all of the other domain values.

FIG. 1 illustrates the concept of taking sample points at regularly-spaced intervals throughout the display-color space, which is the domain of the print-color function. Each sample point is represented by an ordered triplet (R, G, B) which corresponds to values along the red (R), green (G), and blue (B) axes of display-color space. Samples are taken at points 18, 20, 22, 24, 28, 30, 32, 34, 36, 38, 40, 42, 44, 46, and 48. In this manner, the sample points form a rectangular grid throughout the domain of the function. The rectangular grid is comprised of a plurality of rectangular volumes 10.

One advantageous interpolation technique is known as tetrahedral linear interpolation. This technique is often selected in preference to other methods of approximating a function because it requires fewer arithmetic operations to compute an approximation. The reduced number of steps required to execute tetrahedral interpolation has important practical consequences, in that less hardware is required, and the computational steps may be implemented faster and more efficiently.

The process of linear interpolation is used to approximate the value of a function of n variables at n+1 points p, over the domain of the function, by sampling the value v of the function at predetermined intervals. In the case of tetrahedral interpolation, the domain of the function is divided up into a plurality of tetrahedral volumes. A list of these poly- or tetrahedron may be prepared.

The process of dividing the function domain in this manner is often a two-step procedure. Typically, the domain is first divided into rectangular solids as shown in FIG. 1, and then each of the rectangular solids so created is then subdivided into a plurality of tetrahedra.

FIG. 2 sets forth an illustrative example of dividing a function domain 112 into tetrahedral volumes. A rectangular solid 10 is shown, corresponding to any one of the rectangular solids of FIG. 1. The rectangular solid 10 is subdivided into five tetrahedra 200, 202, 204, 206 and 208. Although the geometrical configuration of FIG. 2 illustrates the division of a rectangular volume into five tetrahedra, it is also possible to divide the rectangular volume into another number of tetrahedral structures. For example, the rectangular solids are often divided into six or twelve tetrahedra, and the methods used to accomplish such division are well-known to those skilled in the art.

FIG. 3 is a perspective view illustrating the geometrical structure of a tetrahedron shown in FIG. 2. The tetrahedron 12 is a geometric solid having four planar faces 302, 304, 306 and 308, six edges a—a', b—b', c—c', e—e', f—f' and four vertices 310, 312, 314 and 316. Relatedly, each vertex corresponds to a sample point in the function domain space.

To approximate the value v of the function at any arbitrarily selected point p along the function domain, the tetrahedron containing the selected point must be determined. The function values v at the four vertices 310, 312, 314, and 316 of the selected tetrahedron are sampled, and a standard three dimensional linear interpolation procedure may be applied to the function values v to calculate an approximation for the function value v at the point p. In this manner, it is not necessary to obtain sample values for the function value v at all points along the function domain. The standard method of computing an approximated value uses the formula $$v = \sum_{i=0}^{n} u_i v_i$$

where $v_i$ is the function value at vertex i of the tetrahedron containing the point p at which an approximation is desired. The coefficients $u_i$ are computed from the coordinates of the vertices and of the point p.

For a function of n variables at n+1 points, the standard linear interpolation procedure requires the performance of n+1 multiplication steps and n addition steps. The performance of each of these steps in a processor or computer consumes valuable hardware resources, and increases the time required to calculate an approximation. Consequently, it would be very desirable to reduce the overall number of operations required to implement tetrahedral linear interpolation. Multiplication steps should be avoided wherever possible, as these steps are much more expensive to implement than additions. Accordingly, it would be especially desirable to reduce the number of multiplication operations required to approximate a function value using a processor performing tetrahedral interpolation.

A method of computing a tetrahedral interpolation function is described in "Color Correction Technique for Hard Copies by 4-Neighbors Interpolation Method", *Journal of Imaging Science and Technology*, Vol. 36, No. 1, January-–February 1992, by Katsuhiro Kanamori and Kiroaki Kotera. This method discloses $$\begin{bmatrix} C \\ M \\ Y \end{bmatrix} = [h] \begin{bmatrix} x \\ y \\ z \\ 1 \end{bmatrix} = \begin{bmatrix} H_{Cx} & H_{Cy} & H_{Cz} & 1 \\ H_{Cx} & H_{My} & H_{Mz} & 1 \\ H_{Yx} & H_{Yy} & H_{Yz} & 1 \end{bmatrix} \begin{bmatrix} x \\ y \\ z \\ 1 \end{bmatrix}$$

to compute an approximation for the function value [c,m,y] which corresponds to the colors cyan, magenta and yellow, respectively. This formula represents one of the final steps in computing a function approximation.

The above formula is only applicable in the case of a function having both a three-dimensional input and a three-dimensional output. Quite frequently, however, it is desired to convert a standard Red-Green-Blue (RGB) video image into a Cyan-Magenta-Yellow-Black (CMYB) printed image. Alternatively, it may be desired to process image information received from a plurality of electromagnetic sensors, wherein each sensor is responsive to a different range of frequencies in the electromagnetic spectrum. If the output of each sensor is conceptualized as representing a given dimension, such an imaging system may require the performance of calculations in a number of dimensions greater than three. What is needed is a function approximation method which is capable of being utilized in conjunction with multidimensional functions where the domain inputs, range outputs or both, represent three or more dimensions.

SUMMARY OF THE INVENTION

The invention provides an improved technique for approximating the value of a multivariable function of n variables having function values v at (n+1) domain input points p. The invention is employed in conjunction with tetrahedral linear interpolation processes. These processes operate by dividing the domain of the function into a plurality of tetrahedral volumes. To approximate the value v of the function at any arbitrarily selected point p along the function domain, the tetrahedron containing the selected point is determined. The function values v at the four vertices of the selected tetrahedron are sampled, and the improved linear interpolation procedure of the present invention is applied to the function values v to calculate an approximation for the function value v at the point p.

The improved method of evaluating a tetrahedral linear interpolation function utilizes two processes: a table preparation process and a linear interpolation process. The table preparation process operates as follows. The values v and the domains points p of the function are conceptualized as vectors related by two tetrahedral interpolation variables denoted as the vector t and the matrix T. The mathematical relationship between v, p, T and t is v=t+pT. The coordinates p include n components. The value v includes m components. The matrix T includes m columns and n rows, as it must to relate p to v. If the value of the function is a scalar, then t is also a scalar, and T is a vector of n elements. From the coordinates of the (n+1) domain input points and the function values v at these points, the values of variables t and T are computed and stored in a table.

In a preferred embodiment of the invention, t and T are stored in a two-dimensional array, K[i,j], where the index i ranges over 0 to n, and the index j ranges from 0 to m−1. For 0≤i≤(n−1), the index i addresses the $i^{th}$ component of T. For i=n, the index addresses the value of t. The index j addresses the $j^{th}$ component of T. If the function value v is a scalar, the T and t are stored in a linear array, K[i].

The second process implemented by the invention is a linear interpolation procedure. Using the values tabulated for t and T, an approximation for the components of the function value v may be calculated at a given point p. The function arguments are stored in a first array of n elements denoted as p[i], and the calculated approximations are to be stored in a second array of m elements denoted as v[j]. The approximations for the array v[j] are calculated by evaluating the equation $$v[j] = k[n,j] + \left[ \sum_{i=0}^{(n-1)} p[i] \times k[i,j] \right] \text{ for } j = 0 \text{ to } m-1.$$

Note that this expression requires the performance of n multiplication and n additions to calculate a scalar function value. Assuming that v has m components, the m components of v can be calculated using n×m multiplications and n×m additions.

BRIEF DESCRIPTION OF THE DRAWINGS

The various features, aspects, and advantages of the present invention will become apparent from the following more particular description thereof, presented in conjunction with the following drawings, wherein.

DETAILED DESCRIPTION OF THE PREFERRED EMBODIMENTS

Figure 4:
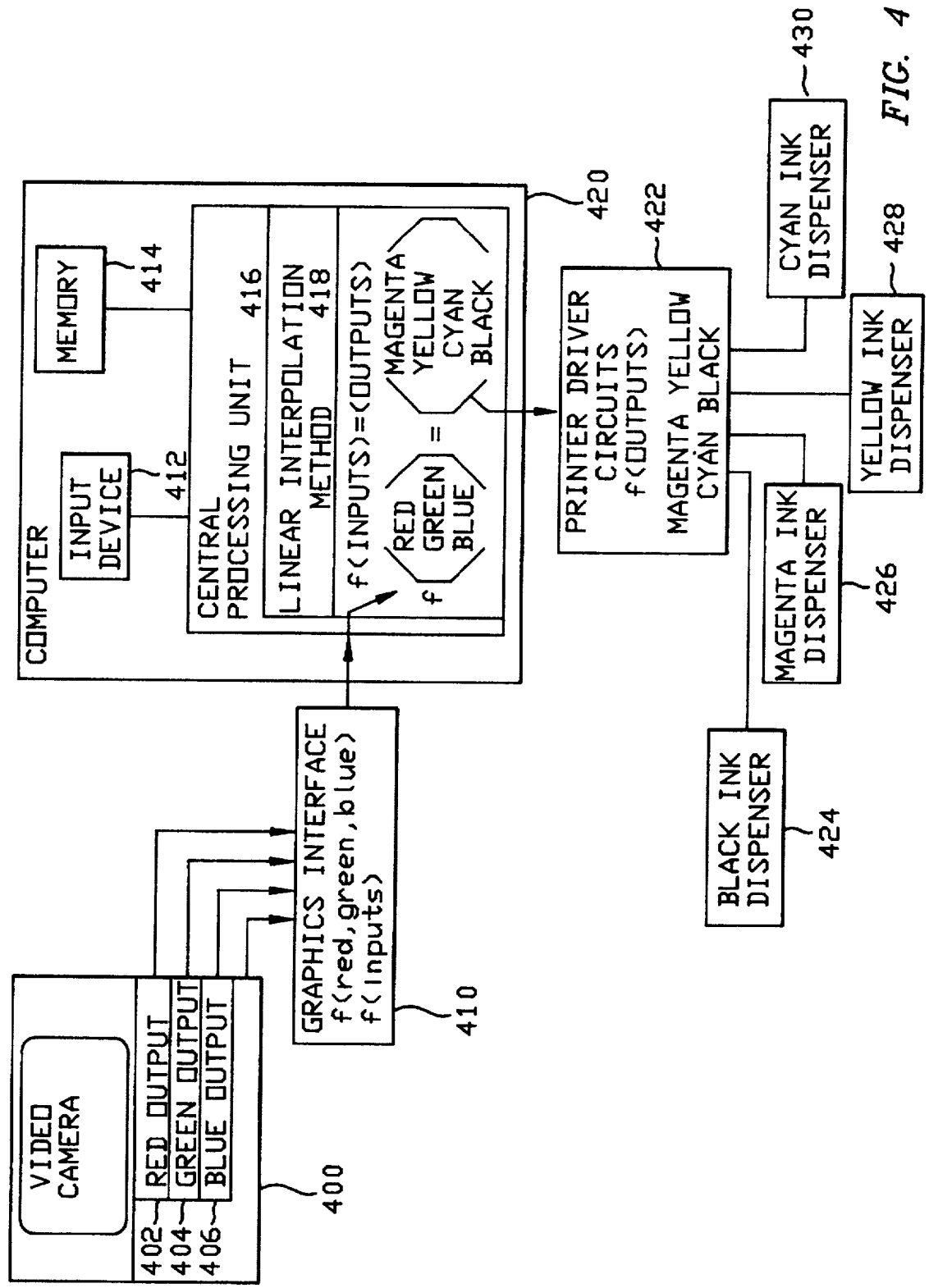
FIG. 4 is a block diagram illustrating the overall operational environment of a preferred embodiment of the present invention in the context of a color image processing system.

FIG. 4 is a block diagram illustrating the overall operational environment of a preferred embodiment of the present invention. The linear interpolation method 418 of the present invention is executed by a computer 420 which includes a central processing unit 416, an input device 412, and memory 414. Computer 420 may be, for example, a simple desktop personal computer, or a large complex mainframe computer. The computer 420 may alternatively be embedded in a printer, performing color transformation functions only or in addition the other control functions. The central processing unit 416 is equipped to execute the instructions necessary to implement the linear interpolation method of the invention. The input device 412 can be a standard QWERTY keyboard.

The computer 420 is coupled to a graphics interface 410 which in the illustrated example interfaces with a video camera 400. The video camera 400 provides a red output 402, a green output 404 and a blue output 406. The outputs are connected to the graphics interface 410, which converts the outputs into a multivariable mathematical function having input variables of red, green and blue. The mathematical function is fed to the central processing unit 416, where the linear interpolation method 418 of the present invention is applied to the function. The output of the linear interpolation method 418 in the present example is a mathematical function having outputs representing quantities of magenta, yellow, cyan and black. These outputs are fed to printer driver circuits 422. These circuits control the amount of ink dispensed by black, magenta, yellow, and cyan ink dispensers 424, 426, 428, and 430 respectively.

FIG. 4 shows the invention as being employed in the context of a video camera 400 and ink dispensers 424, 426, 428 and 430 for illustrative purposes. For example, a photoluminescent video display screen could be used in place of the video camera 400. Furthermore, the invention may be employed in contexts other than color image processing, wherever is desired to approximate the value of a multivariable function.

Figure 5:
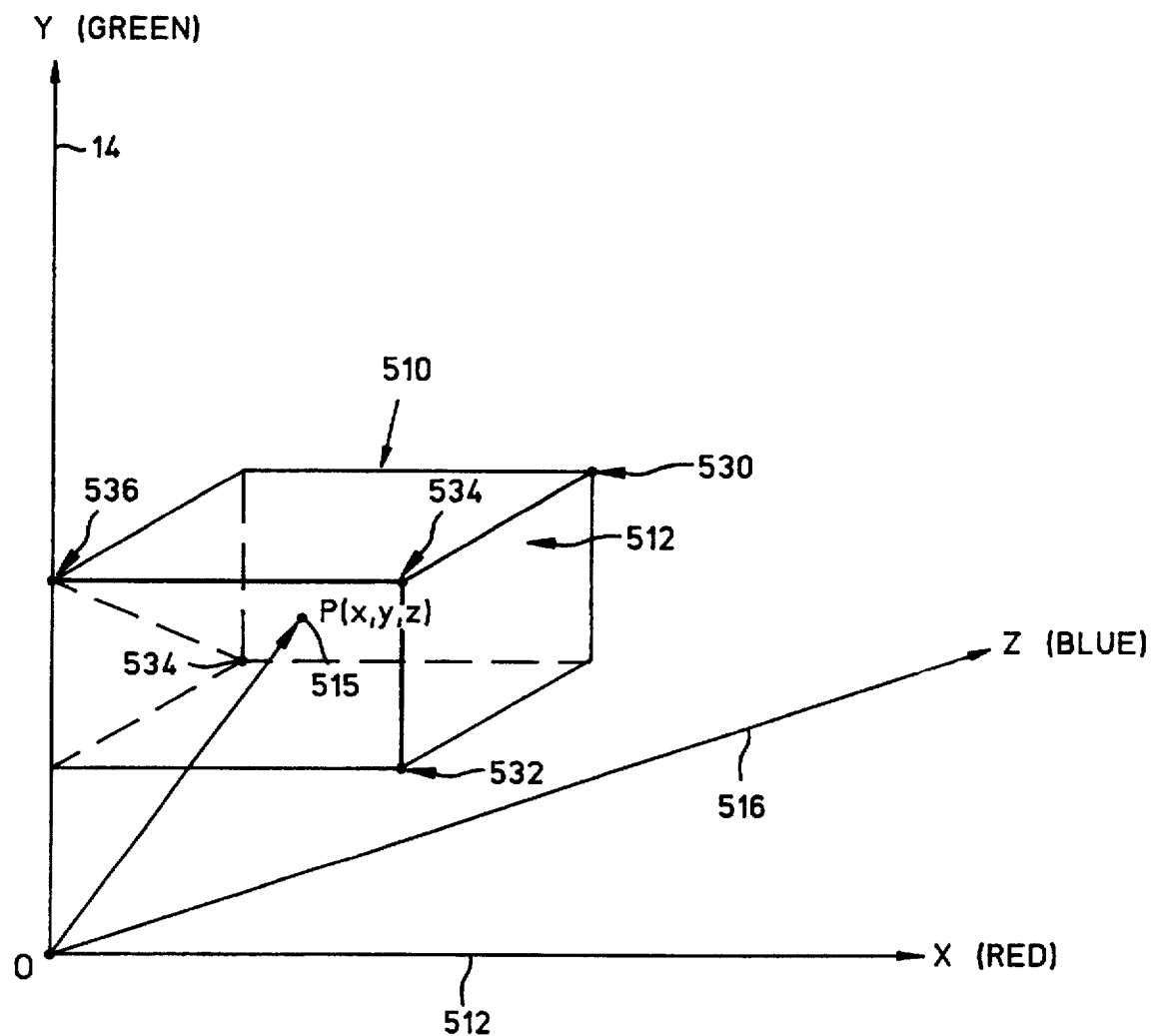
FIG. 5 is a three-dimensional graph illustrating an selected point within the domain of the function shown in FIG. 1.

FIG. 5 is a three-dimensional graph illustrating a point p 515 from the domain of a function f. This point represents a domain input point at which a function output value is to be approximated. The x axis 512 represents the magnitude of the color red, the y axis 514 represents the magnitude of the color green, and the z axis 516 represents the magnitude of the color blue. Allowable values for x, y, and z are in the range of 0 to 100, which defines the domain of the function. Although 8-bit values are frequently employed to represent color, the function domain is simplified in this example for purposes of illustration. The point p 515 represents the color of one picture element (pixel) within a given video image specified in additive primary color form.

In the present example, point p 515 represents a pixel of a color image received by a video camera. Assume that the video camera was aimed at the ocean, resulting in a point p 515 at a location of x=10, y=50, and z=80, corresponding to a color in the range of cyan to blue. It is desired to convert the video image into a form suitable for newspaper print. The additive primary color representation of the pixel must be converted into a form representing subtractive primary colors. The conversion process may be expressed as a mathematical function with input variables of red, green and blue, and output values of magenta, yellow, and cyan.

Figure 1:
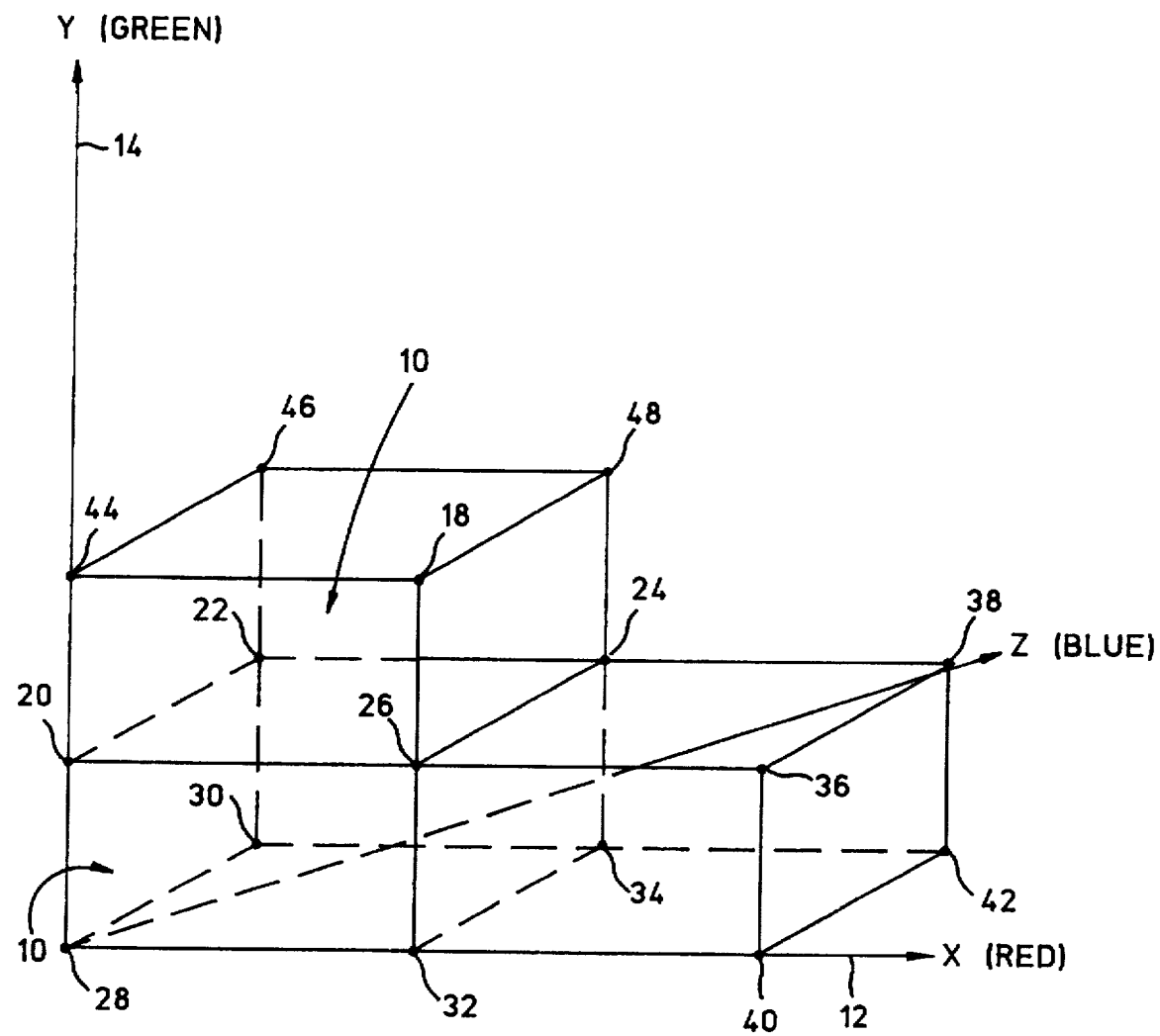
FIG. 1 is a perspective view illustrating the division of the domain of a multivariable mathematical function into rectangular solids.
Figure 2:
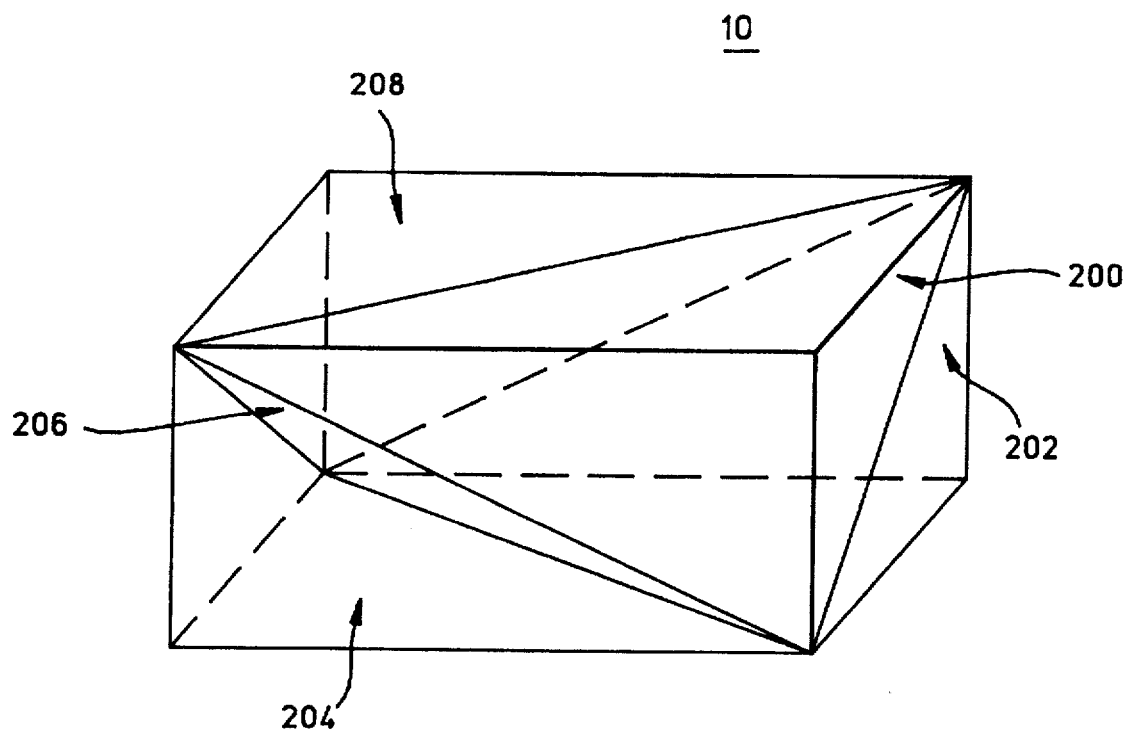
FIG. 2 is a perspective view illustrating the subdivision of a rectangular solid into a plurality of tetrahedral structures.
Figure 3:
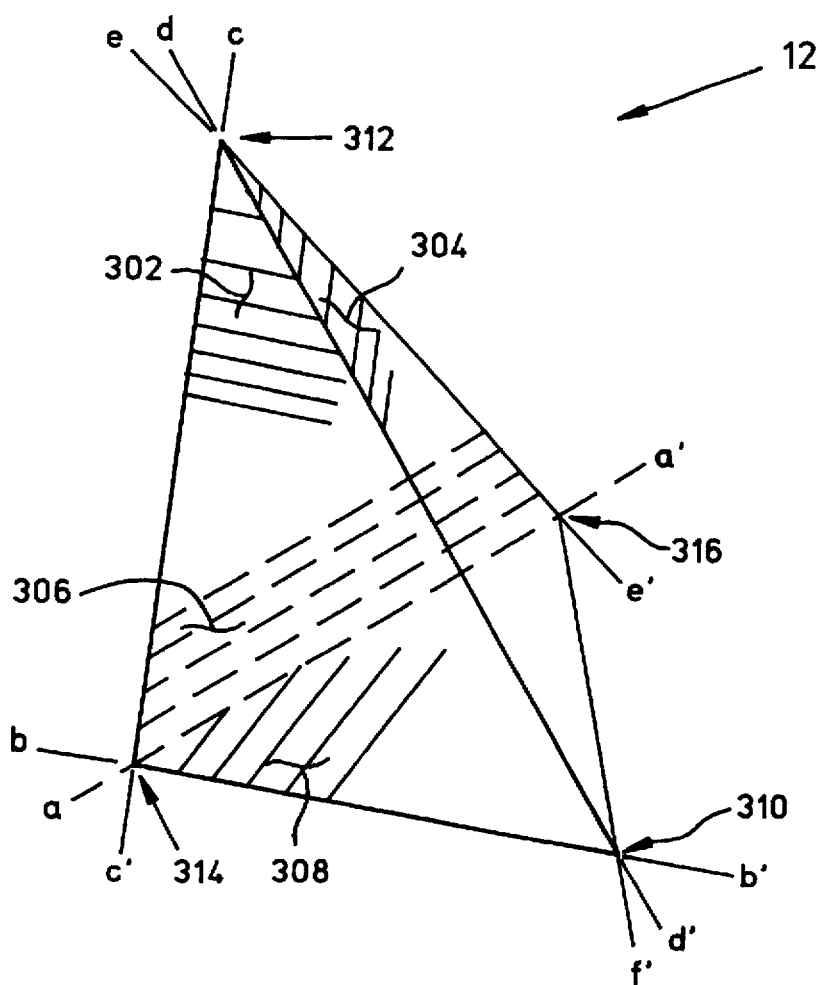
FIG. 3 is a perspective view illustrating the geometrical properties of a tetrahedron.

Since the mathematical function for color conversion is relatively complex, it does not readily lend itself to analytical specification. It would be much more efficient to sample the value of the function at representative points throughout the function domain, and to tabulate these values for future reference. Accordingly, the domain of the function is divided as indicated in FIGS. 1–3, and sample values for the function are taken at the vertices of each tetrahedron. Then, if it is desired to known the value of the function at a selected point p 515 within the function domain, the value of the function can be interpolated by referring to the known function values at the nearest sample points. This is accomplished by first locating the rectangular solid 510 containing the selected point p 515, then determining the tetrahedron 512 within the solid that contains point p 414. The sampled values of the function at the vertices 530, 532, 534 and 536 of the selected tetrahedron are utilized in the interpolation process to calculate an approximate value for the function at the selected point p 515.

Point p 515 at the coordinates (10, 50, 80) lies within the tetrahedral having vertices 530, 532, 534 and 536. The relationship between the additive and subtractive primary colors has been characterized at each of the tetrahedron vertices 530, 532, 534, and 536. For example, assume that vertex 530 has coordinates of (12, 56, 84) representing respective quantities of red, green, and blue. During the function sampling process, it was determined that these quantities of red, green and blue correspond to the magenta value of 32, a yellow value of 12, and a cyan value of 84. Similar samples were taken at vertices 532, 534 and 536. The known relationship between function input (red, green, blue) and output (magenta, yellow, cyan) at these vertices 530, 532, 534, 536 is utilized by linear interpolation procedures to approximate the relationship between function input and output at points where the exact relationship between function input and output is not known. The relative ease or difficulty by which the function may be approximated oftentimes determines the overall efficiency of the color imaging process. Therefore, is high desirable to develop fast, effective methods of linear interpolation.

The invention provides improved methods for approximating the value of a multivariable function of n variables having function values v at (n+1) domain input points p. Such multivariable functions are frequently employed in the field of color image processing systems. The invention approximated these functions using tetrahedral linear interpolation processes as described above. To summarize briefly, these processes operate by dividing the domain of the function into a plurality of tetrahedral volumes, as shown in FIG. 2. To approximate the value v of the function at selected point p 525 (FIG. 5) along the function domain, the tetrahedron containing the selected point is determined. The function values v at the four vertices 530, 532, 534 and 536 (FIG. 5) of the selected tetrahedron are sampled, and the improved linear interpolation procedure of the present invention is applied to the function values v to calculate an approximation for the function value v at the point p 515.

The tetrahedral linear interpolation procedure is applied to a mathematical function as follows. The function has values which are known at n+1 points denoted by vectors $p_i$. The values may have been calculated from a formula or sampled at those points for example, by measuring the values with an appropriate instrument.

A point p may be described as the sum of n+1 vectors. The first vector is a vector from the origin to the point $p_o$, one of the n+1 points at which the function value is known. The other n vectors are of the following form: the $i^{th}$ vector, for i=1 to n, is parallel to the vector from $p_o$ to $p_i$, and its length is the length of the vector from $p_o$ to $p_i$ scaled by the factor $u_i$. Mathematically, the $i^{th}$ vector is given by $u_i(p_i-p_o)$.

Figure 6:
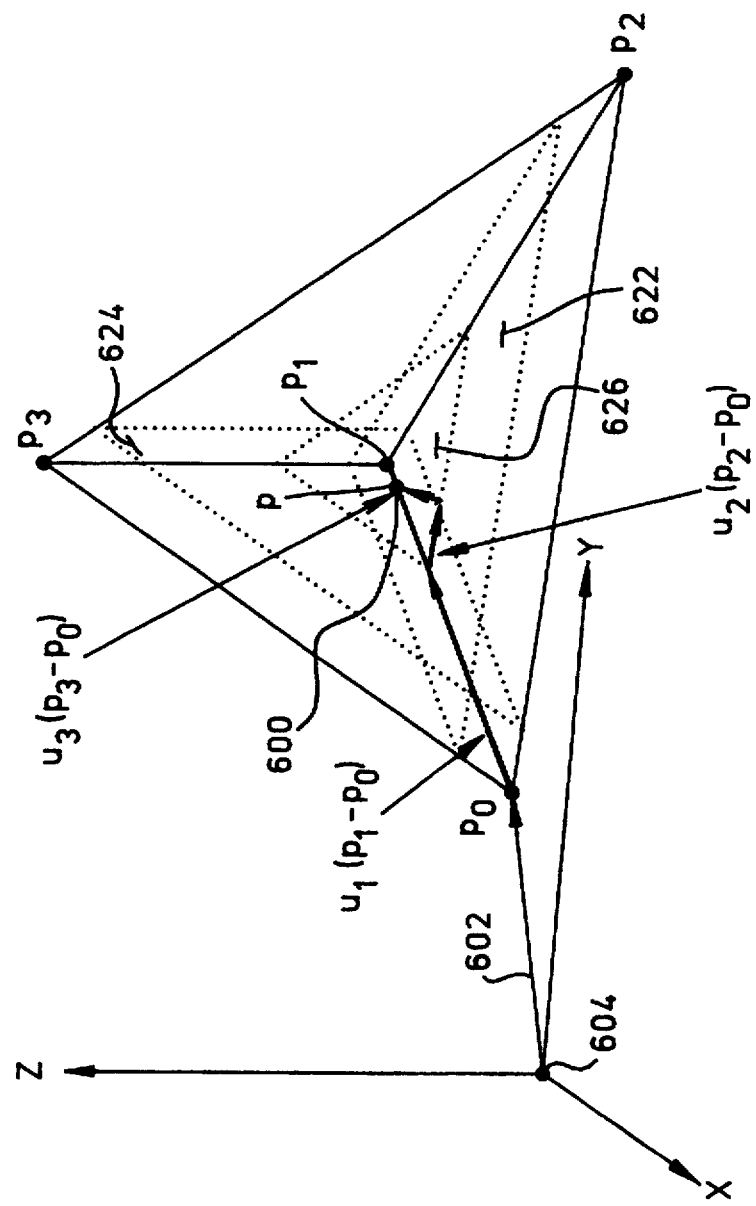
FIG. 6 is a perspective view showing a point p as the sum of N+1 vectors.

FIG. 6 illustrates how a point p (600) enclosed in a known tetrahedron 620 defined by known points $p_o$, $p_i$, $p_2$ and $p_3$ can be expressed as the sum of n+1 vectors. For example, let n=3. The four vectors are a vector 602 from the origin to the closest tetrahedron vertex, $p_o$ and three other vectors: $u_1$ ($p_i-P_o$), $u_2$ ($p_2-p_o$) and $u_3$ ($p_3-p_o$).

The points $p_o$, $p_i$, $p_2$ and $p_3$ are the vertices of the tetrahedron 620. Each of the three planes 622, 624, 626 which cut the tetrahedron walls serves to divide the distance from the tetrahedron wall opposite the point $p_i$ to the point $p_i$ in the ratio $u_i$:1−$u_i$. Each of the three vectors traversing the distance from $p_o$ to $p_i$ has its tail on the tetrahedron wall opposite $p_i$, points in the same direction as the vector from $p_o$ to $p_i$, and has its head on the plane which divides the distance from the face to the point in the ratio $u_i$:1−$u_i$, so that its length is the magnitude of $u_i$ ($p_i-p_o$). Although FIG. 6 represents vectors for the point p, the figure is also applicable to the value v at the point p.

A function value v may be defined as the sum of n+1 vectors including a vector from the origin to a value $v_o$, and n additional vectors. The n additional vectors are of the following form: the $i^{th}$ vector; for i=1 to n, is parallel to the vector from $v_o$ to $v_i$, and its length is the length of the vector from $v_o$ to $v_i$ scaled by the factor $u_i$. Each vector of the function value v corresponds to a scaling factor $u_i$. The respective scaling factors $u_i$ are applied to corresponding $v_i$, such that the value v is determined as the sum of the starting value vector plus the sum of each value summation vector scaled by the scaling factors $u_i$. The values at the point p and known values at the vertices of the n+1 points are related by the same scaling factors $u_i$ as the coordinates of the points are. A set of simultaneous linear equations expresses this relationship:

$$p = p_0 + \sum_{i=1}^{n} u_i(p_i - p_0)$$

$$v = v_0 + \sum_{i=1}^{n} u_i(v_i - v_0)$$

The standard method of implementing tetrahedral interpolation is to solve the first of the two above equations for $u_i$ and compute the value at the point p by substituting $u_i$ in the second equation. Once the $u_i$ are known, computation of an approximation takes n+1 multiplications and n additions, for each component of the output value.

Computation of the values of $u_i$ is much more expensive, so whenever possible they are pre-computed and stored in tables. Because these values depend on the coordinates of the point p, it is generally only possible to precompute them when the function domain will only be addressed at discrete points, as when the input is expressed as low precision integer, a very common situation. A convenient method is to subdivide the function domain into a plurality of rectangular volumes, such as cubes, so that some number of high-order bits select a cube and the remaining low-order bits select a specific point within the cube. The point selected by the low-order bits always has the same relationship to the cube and the tetrahedra that the cube is divided into. A calculation may be performed in advance to determine which tetrahedron contains the point particular combination of low-order bits selects, and the constants $u_i$ needed to compute an approximation. The tabulated result for all combinations of the low-order bits applies to all of the cubes divided into tetrahedra using a particular geometric configuration of tetrahedra within each cube.

The equations set forth in the above paragraph may be expressed in matrix form. This form facilitates solving directly for the value at the point p. Once this is done, a method for computing the value at the point p may be developed which uses fewer arithmetic operations than the standard method. It is only necessary to precompute the components of the matrix T and the vector t, which depend only on the coordinates of the n+1 points at which the function values are known and the values at those points, and not on the coordinates of the point p.

The improved method of evaluating a tetrahedral linear interpolation function utilizes two processes. The first process is a table preparation procedure and the second process is a linear interpolation procedure. Prior to the performance of the table preparation procedure, a preliminary series of operations is conducted to solve the interpolation equations for a function value. Either of two approaches for solving the interpolation equations may be utilized. The first approach uses tetrahedral linear interpolation equations for v and p, these equations are of the form:

$$p = p_0 + \left[ \sum_{i=1}^{n} u_i(p_i - p_0) \right] \text{ and}$$

$$v = v_0 + \left[ \sum_{i=1}^{n} u_i(v_i - v_0) \right].$$

These formulas state that if the coordinates of the point p, $[x_0, x_1, \ldots x_{n-1}]$ are conceptualized as being equal to the values of the n arguments for the function $f(x_0, x_1, \ldots x_{n-1})$, then the function valued at the point p is related to the values at the n+1 points at which the value is known, in the same way that the coordinates of the point p are related to the coordinates of the n+1 points. Specifically, the point p may be described as a vector which is the sum of n+1 vectors, as described above. The value at the point p may also be described as the sum of n+1 vectors, and the scale factors used are the same $u_i$ used to describe the point p. The value of the function, v, at the point p is the sum of the value $v_o$ at the point $p_o$, plus the values $v_i$ at the points $p_i$ each less the value $v_o$ at point $p_o$, scaled by the same factors $u_i$. Although many prior art tetrahedral linear interpolation techniques utilize function having scalar values v, the present invention is applicable in the context of vector, as well as scalar, function values v.

The procedure for solving the equations for a function value continues by placing the interpolation equations in matrix form as follows:

$$p = [x_0 \, x_1 \ldots x_{n-1}] = [x_{00} \, x_{01} \ldots x_{0n-1}] +$$

$$[u_1 \, u_2 \ldots u_n] \begin{bmatrix} x_{10} - x_{00} & x_{11} - x_{01} & \ldots & x_{1n-1} - x_{0n-1} \\ x_{20} - x_{00} & x_{21} - x_{01} & \ldots & x_{2n-1} - x_{0n-1} \\ \cdot & \cdot & & \cdot \\ \cdot & \cdot & & \cdot \\ \cdot & \cdot & & \cdot \\ x_{n0} - x_{00} & x_{n1} - x_{01} & \ldots & x_{nn-1} - x_{0n-1} \end{bmatrix} = p_0 + uM$$

$$v = [a_0 \, a_1 \ldots a_{m-1}] = [a_{00} \, a_{01} \ldots a_{0m-1}] +$$

-continued $$[u_1 \, u_2 \ldots u_n] \begin{bmatrix} a_{10} - a_{00} & a_{11} - a_{01} & \ldots & a_{1m-1} - a_{0m-1} \\ a_{20} - a_{00} & a_{21} - a_{01} & \ldots & x_{2m-1} - a_{0m-1} \\ \cdot & \cdot & & \cdot \\ \cdot & \cdot & & \cdot \\ \cdot & \cdot & & \cdot \\ a_{n0} - a_{00} & a_{n1} - a_{01} & \ldots & a_{nm-1} - a_{0m-1} \end{bmatrix} = v_0 + uN$$

In the above equations, the variable m denotes the number of elements in v. Once the equations are in matrix form, the next step is to solve for $u_i$ in the interpolation equation involving p. In this manner, $u=(p-p_o)(M^{-1})$. The $u_i$ calculated are then substituted into the interpolation equation involving v.

The function value equation is obtained by observing that $v=v_o+uN=v_o+(p-p_o)(M^{-1})N=(v_o-(p_o*M^{-1}*N))+pM^{-1}N=t+pT$. The variables t and T depend only upon the coordinates of the points at which the function values are known, for example, $p_i$ from i=1 to n, and the function values $v_i$ at these points. Consequently, the values of t and T may be precomputed and stored in a table.

The second approach for solving the equations for a function value commences by obtaining the tetrahedral linear interpolation equations for v and p. This step is identical to the step described above in conjunction with the first approach. Next, $p_o$ is isolated from the interpolation equation as follows:

$$p = p_0 + \sum_{i=1}^{n} u_i(p_i - p_0)$$

$$p = \left( p_0 - \sum_{i=1}^{n} u_i B_0 \right) + \sum_{i=1}^{n} u_i p_i$$

$$p = p_0 \left( 1 - \sum_{i=1}^{n} u_i \right) + \sum_{i=1}^{n} u_i p_i$$

A scaling constant $u_o$ is defined as follows:

$$u_0 = 1 - \sum_{i=1}^{n} u_i$$

The variable $v_o$ is isolated such that the interpolation equations now read:

$$p = \sum_{i=0}^{n} u_i p_i, \text{ and } v = \sum_{i=0}^{n} u_i v_i, \text{ where } \sum_{i=0}^{n} u_i = 1$$

These equations are in a form known as the barycentric combination form, because p and v are expressed as weighted sums of a tetrahedron's vertices and the values at these tetrahedron's vertices, respectively, and also because these weighted sums each add up to 1.

The next step is to write the barycentric combination equations in matrix form to yield:

$$p = [x_0 \, x_1 \ldots x_{n-1} \, 1] =$$

$$[u_0 \, u_1 \ldots u_n] \begin{bmatrix} x_{00} & x_{01} & \ldots & x_{0n-1} & 1 \\ x_{10} & x_{11} & \ldots & x_{1n-1} & 1 \\ \cdot & \cdot & & \cdot & \cdot \\ \cdot & \cdot & & \cdot & \cdot \\ \cdot & \cdot & & \cdot & \cdot \\ x_{n0} & x_{n1} & \ldots & x_{nn-1} & 1 \end{bmatrix} = u\tilde{M}$$

$$v = [a_0 \, a_1 \, \ldots \, a_{m-1} \, 1] =$$

$$[u_0 u_1 \ldots u_n] \begin{bmatrix} a_{00} & a_{01} & \cdots & a_{0m-1} & 1 \\ a_{10} & a_{11} & \cdots & a_{1m-1} & 1 \\ \cdot & \cdot & & \cdot & \cdot \\ \cdot & \cdot & & \cdot & \cdot \\ \cdot & \cdot & & \cdot & \cdot \\ a_{n0} & a_{n1} & \cdots & a_{nm-1} & 1 \end{bmatrix} = u\tilde{N}$$

The variable m is used to denote the number of elements in v. The equation involving p is then used to solve for the $u_i$, wherein $u = p\tilde{M}^{-1}$. The $u_i$ are substituted into the equation involving v, resulting in: $v = u\tilde{N} = p\tilde{M}^{-1}\tilde{N}$. The function value equation is obtained by setting $p\tilde{M}^{-1}\tilde{N} = p\tilde{T}$.

The variable $\tilde{T}$ is only dependent upon the coordinates of sample points at which the function values are known, such as points $p_i$, where i=1 to n, and the function values $v_i$ at these points. The first n elements of $\tilde{T}$ are the elements of T computed by the first approach of described above, and the last element of $\tilde{T}$ is the value of t computed by the first approach. The components of $\tilde{T}$ do not depend upon the coordinates of the point p.

The matrix calculated provides an equation solution method with an important advantage. Note that the last elements of p in the homogenous coordinate matrix are all 1. Therefore, the matrix multiplication needed to calculate the m components of v can be done using only n×m multiplications and n×m additions. If the function returns a scalar value, then $\tilde{T}$ is a vector of n+1 elements. However, in this case, the last element is multiplied by the last element of p, which is 1. Accordingly, the interpolated value can thereby be obtained using n multiplications and n additions.

Solving the tetrahedral interpolation equations for the function values yields two sets of equations:

$$v = t + pT \quad T = M^{-1} N \quad t = v_o - p_o(M^{-1}N) = v_o - p_o T \quad (1)$$

and $$v = p\tilde{T} \quad \tilde{T} = \tilde{M}^{-1}\tilde{N} \quad (2)$$

These two sets of equations are equivalent and lead directly to two alternative embodiments of the invention. In each set, the first equation is an interpolation equation, which gives an approximate function value interms of the coordinates of a point in the function domain and the constants t and T, or $\tilde{T}$. Each set of equations includes expressions for the appropriate constants, in terms of the coordinates of the vertices of a tetrahedron in the function domain and the known function values at the vertices.

The invention comprises two processes, a table preparation procedure and an interpolation procedure. The table preparation process is carried out once for a particular function. It consists of subdividing the function domain into tetrahedra, and storing the values of t and T, or of $\tilde{T}$, for each tetrahedron in the function domain. The interpolation process is carried out for each set of function arguments for which an approximation is desired. It consists of setting the function arguments to be the coordinates of a point p, locating the tetrahedron which contains the point p, and evaluating the interpolation equation.

Figure 7A:
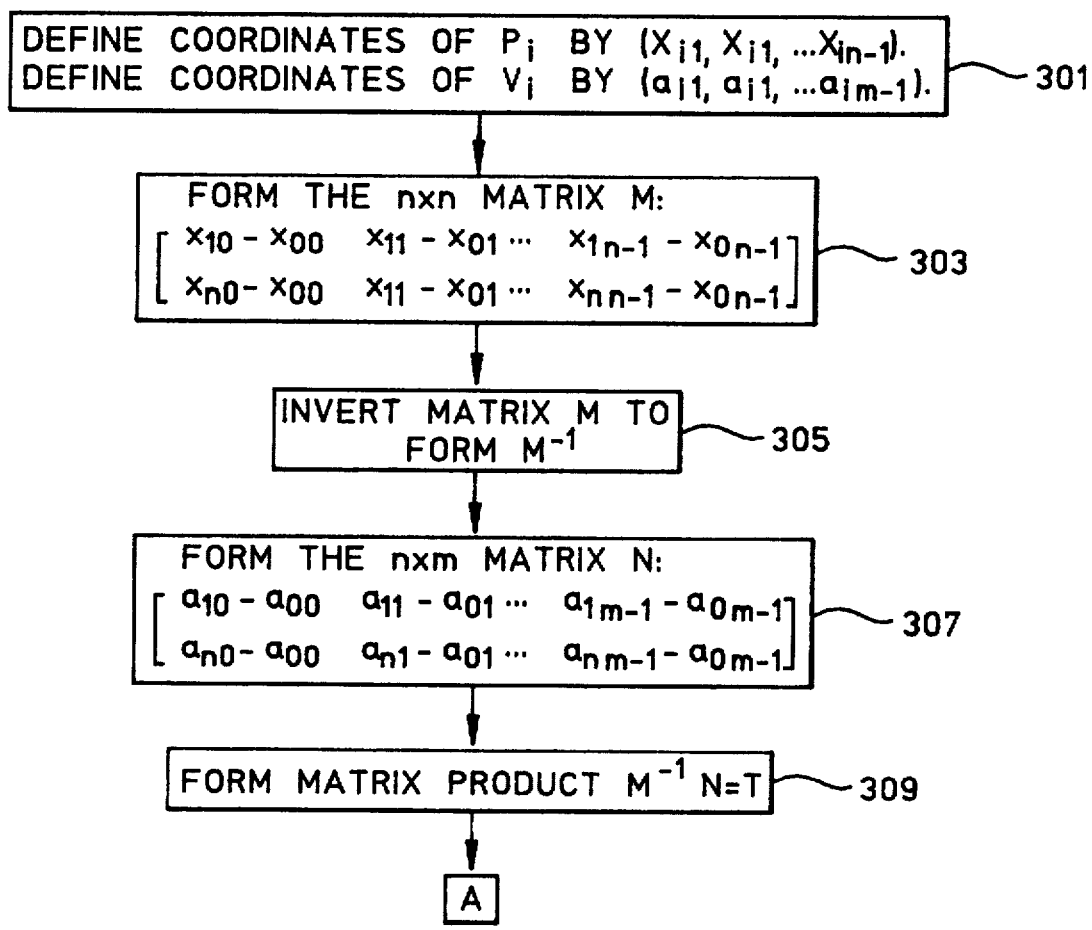
FIGS. 7A and 7B are a flowchart setting forth the operational sequences for preparing an interpolation table according to a first embodiment of the present invention.
Figure 7B:
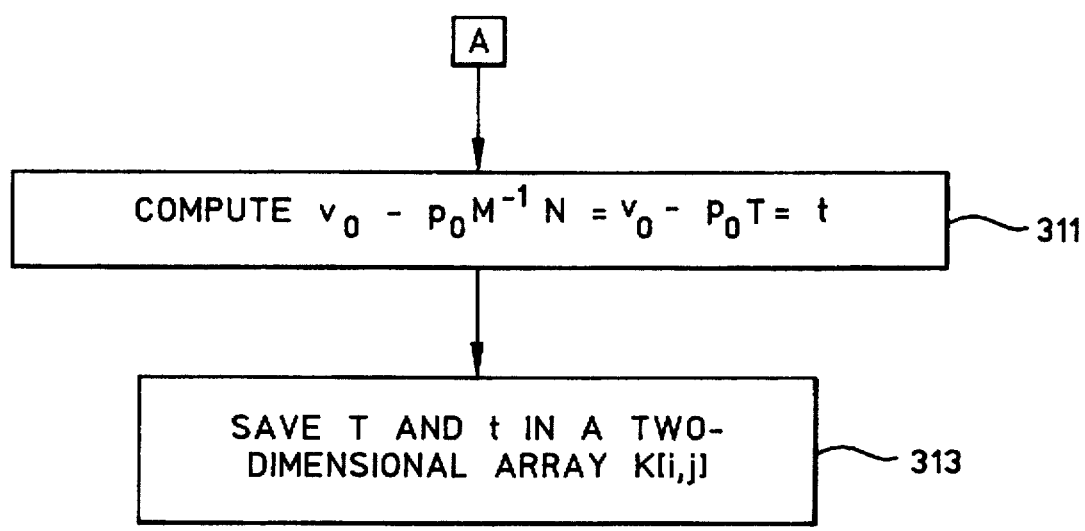

The table preparation procedure is shown in two embodiments, each corresponding to a respective one of the sets of equations discussed above. The first table preparation procedure embodiments is illustrated in FIGS. 7A and 7B, the second in FIG. 8.

The table preparation process of FIGS. 7A and 7B operates as follows. The values v and the domain points p of the function are conceptualized as vectors related by two tetrahedral interpolation variables denoted as the matrix T and the vector t. The mathematical relationship between v, p, T, and t, is v=t+pT. The coordinates of point p include n components. The value v includes m components. The matrix T includes rows and m columns, as it must to relate p to v. If the value of the function is a scalar, then t is also a scalar and T is a vector of n elements. From the coordinates of the (n+1) domain input points and the function values v at these points, the values of variables t and T which were previously computed are now stored in a table.

The table preparation process commences at block 301, where the coordinates of $p_i$ are defined as $x_{i0}, x_{i1}, \ldots x_{in-1}$, and the coordinates of $v_i$ are defined as $a_{i0}, a_{i1}, \ldots a_{im-1}$. Next, at block 303, the n×n matrix M is formed:

$$\begin{bmatrix} x_{10} - x_{00} & x_{11} - x_{01} & \cdots & x_{1n-1} - x_{0n-1} \\ x_{20} - x_{00} & x_{21} - x_{01} & \cdots & x_{2n-1} - x_{0n-1} \\ \cdot & \cdot & & \cdot \\ \cdot & \cdot & & \cdot \\ \cdot & \cdot & & \cdot \\ x_{n0} - x_{00} & x_{n1} - x_{01} & \cdots & x_{nn-1} - x_{0n-1} \end{bmatrix}$$

At block 305, the matrix is inverted to form $M^{-1}$. The matrix inversion is performed using standard techniques such as Gaussian elimination or the determinants formula. Next (block 307), the n×m matrix N is formed:

$$\begin{bmatrix} a_{10} - a_{00} & a_{11} - a_{01} & \cdots & a_{1m-1} - a_{0m-1} \\ a_{20} - a_{00} & a_{21} - a_{01} & \cdots & a_{2m-1} - a_{0m-1} \\ \cdot & \cdot & & \cdot \\ \cdot & \cdot & & \cdot \\ \cdot & \cdot & & \cdot \\ a_{n0} - a_{00} & a_{n1} - a_{01} & \cdots & a_{nm-1} - a_{0m-1} \end{bmatrix}$$

At block 309, the matrix product $M^{-1} N$ is formed. This product is the value of T. It is a matrix of dimensions n×m, just like N. If v is a scalar, then T is a vector of n elements. Program control progresses to block 311 (FIG. 7B), where the value of the mathematical expression $v_o - p_o M^{-1} N = v_o - p_o T$ is computed. This expression is equal to the value of t. It is a vector of m elements, or scalar if v is a scalar. The values of T and t are saved in a two-dimensional array at block 313.

In a preferred embodiment of the invention, t and T are stored in a two-dimensional array, K[i,j], where the index i ranges over 0 to n, and the index j ranges from 0 to m−1. For $0 \leq i \leq n-1$, the index i addresses the $i^{th}$ component of T. For i=n, the index addresses the $i^{th}$ component of T. The index j addresses the $j^{th}$ component of T. If the function value v is a scalar, the T and t are stored in a linear array, K[j].

Figure 8:
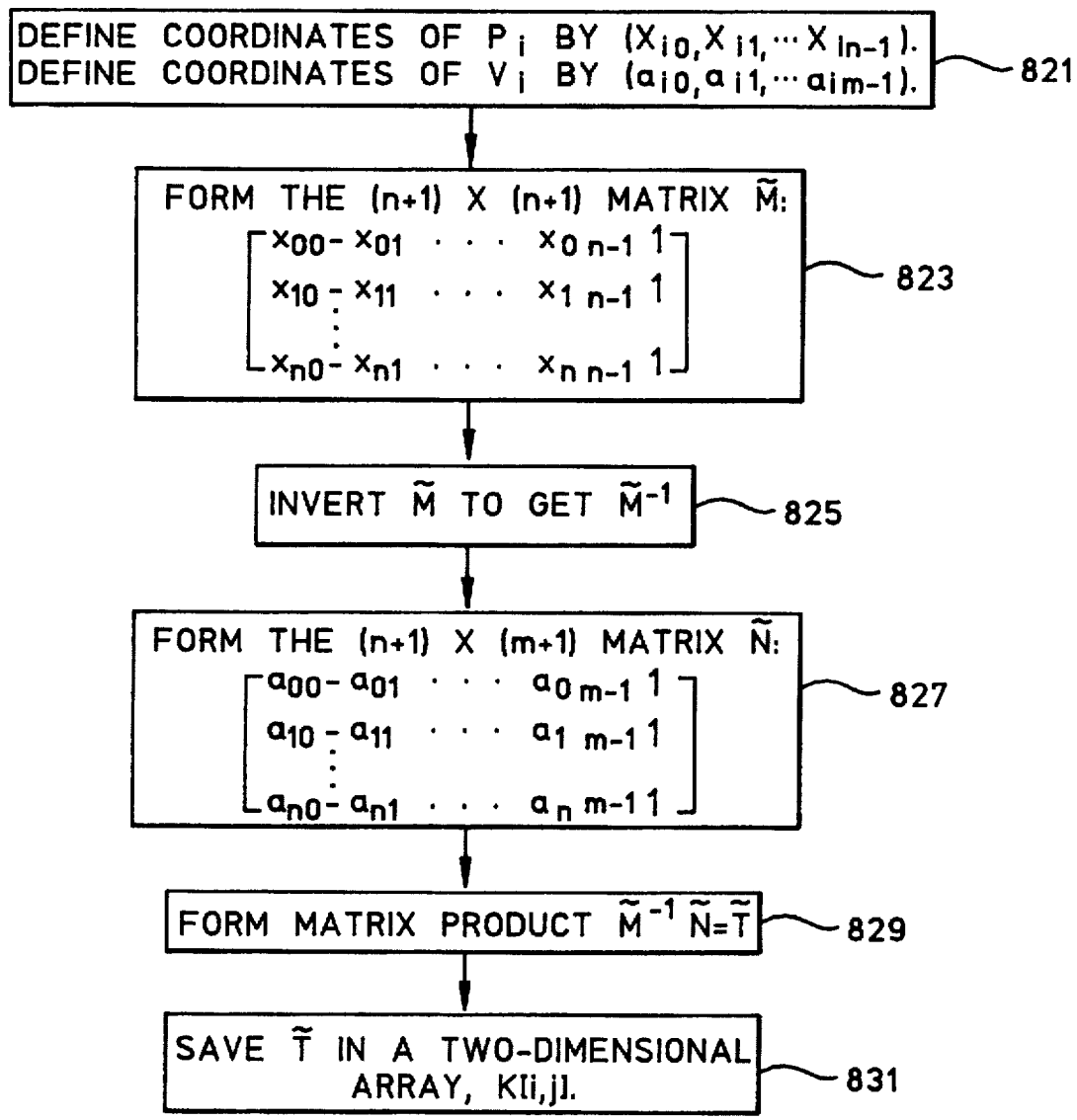
FIG. 8 is a flowchart setting forth the operational sequences for preparing an interpolation table according to a second embodiment of the present invention.

A method for preparing a table according to a second embodiment of the invention is set forth in FIG. 8. The method commences at block 821, where the coordinates of $p_i$ and $v_i$ are defined. The variable $p_i$ is represented by $x_{i0}, x_{i1}, \ldots x_{in-1}$, and the variable $v_i$ is represented by $a_{i0}, a_{i1}, \ldots x_{im-1}$. At block 823, a n+1×n+1 matrix $\tilde{M}$ is formed from $p_i$ as follows:

$$\begin{bmatrix} x_{00} & x_{01} & \cdots & x_{0n-1} & 1 \\ x_{10} & x_{11} & \cdots & x_{1n-1} & 1 \\ \cdot & \cdot & & \cdot & \cdot \\ \cdot & \cdot & & \cdot & \cdot \\ \cdot & \cdot & & \cdot & \cdot \\ x_{m0} & x_{m1} & \cdots & x_{mn-1} & 1 \end{bmatrix}$$

The matrix $\tilde{M}$ is inverted to form matrix $\tilde{M}^{-1}$ (block 825). The inversion is performed using any standard method such as, for example, Gaussian elimination or the determinants formula. Next, the n+1×n+1 matrix $\tilde{N}$ is formed from $v_i$ as follows (block 827): $\begin{bmatrix} a_{00} & a_{01} & \cdots & a_{0m-1} & 1 \\ a_{10} & a_{11} & \cdots & a_{1m-1} & 1 \\ \cdot & \cdot & & \cdot & \cdot \\ \cdot & \cdot & & \cdot & \cdot \\ \cdot & \cdot & & \cdot & \cdot \\ a_{n0} & a_{n1} & \cdots & a_{nm-1} & 1 \end{bmatrix}$ Note that the matrix $\tilde{N}$ is a vector of n+1 elements if v is a scalar. A matrix product is formed by multiplying matrix $\tilde{M}^{-1}$ by matrix $\tilde{N}$ (block 829). This product is the value of $\tilde{T}$. $\tilde{T}$ is saved in a two-dimensional array, k[i,j], which, for a given function, is the same array which would have been produced by the first table preparation method of FIGS. 7A and 7B. The index i has a range of values from 0 to n, and addresses $T_j$, which is the $i^{th}$ component of $\tilde{T}$. The index j has a range of values from 0 to m, and addresses the $j^{th}$ component of $T_i$. If the function value v is a scalar, then $\tilde{T}$ is stored in a linear array, K[i]. The matrix $\tilde{T}$ is a matrix of dimensions n+1×m+1, and is a vector of n+1 elements if v is a scalar. Consequently, $\tilde{T}$ has the same dimensions as the matrix $\tilde{N}$.

The second major process implemented by the invention is a linear interpolation procedure. This procedure employs the table prepared according to one of the techniques set forth in FIGS. 7A, 7B, and 8. From the tabulated values of t and T (FIGS. 7A and 7B), or from the tabulated values of $\tilde{T}$ (FIG. 8), an approximation for the components of the function value v may be calculated at a given point p. The function arguments are stored in a first array of n elements denoted a p[i], and the calculated approximations are to be stored in a second array of m elements denoted as v[j].

The approximations for the array v[j] are calculated by evaluating the equation $$v[j] = K[n,j] + \sum_{i=0}^{n-1} p[i] \times K[i,j], \text{ for } j = 0 \ldots m-1.$$

Assuming that v has m components, the m components of v can be calculated using n×m multiplications and n×m additions. If the function value is a scalar, then the interpolated value is obtained using n multiplications and n additions. The expression for a scalar value is:

$$v = K[n] + \sum_{i=0}^{n-1} p[i] \times K[i]$$

This expression uses n multiplications and n additions to calculate a scalar value.

A preferred embodiment of the tetrahedral linear interpolation procedure of the present invention operates in the context of a scalar function of three variables. Each input component of the function is represented by an 8-bit value. The allowable range of input values is defined as the domain of the function. As with prior art interpolation procedures, the domain of the function is divided into rectangular solids, and each rectangular solid is subdivided into six tetrahedral solids.

To approximate the function value at a particular point, the tetrahedron containing the point is extracted. Next, the tetrahedral linear interpolation procedure of the present invention is applied to this tetrahedron. The procedure computes an approximation from the function values at the vertices of the extracted tetrahedron. As stated in conjunction with FIGS. 7A, 7B and 8, the procedure of the present invention operates using but one table, whereas the prior art techniques require the use of at least two tables.

Sample points must be chosen which are situated within the domain of the function. For example, sample points may be chosen so that there are 16 intervals for each input component, yielding a total of 17 values. This subdivides the function domain into 4096 (16×16×16) rectangular solids. Each rectangular solid is further divided into 6 tetrahedra.

A preferred embodiment of the invention utilizes a bit addressing scheme in conjunction with the 8-bit function values. Assume that the function is continuous even outside the domain of interest, and that the function may be evaluated at the points with a bit representation of (x,y,z)= (100000000,*,*), (x,y,z)=(*,100000000,*), and (x,y,z)=(*,*, 100000000). By definition, these points are outside the domain of interest, but they are required in order to compute approximate values for certain points situated within the domain. So long as the function is continuous, uniform addressing values may be employed. If the assumption of a continuous function is not valid, then the intervals with all four high order bits of any component equal to 1 must be treated as special cases.

Assuming a continuous function, each address component of each sample point has zeros for the four low order bits. A sample point (and the rectangular solid including the sample point) may be addressed by the expression r=256$x_h$+ 16$y_h$+$z_h$, where x=16$x_h$+$x_1$, y=16$y_h$+$y_1$, and z=16$z_h$+$z_1$, and $x_h$ is the number formed by the four high order bits of x, $x_1$ is the number formed by the four low order bits of x, and similarly for y and z.

Using the above-described addressing scheme, the three elements of the vector T and the value of t are precomputed in each rectangular solid, and stored as elements of a three dimensional array, K[r,t,v] of 98,304 entries (4096×6×4). The index r has a range from 0 to 4095, and is employed to select a rectangular solid in the function domain. The index for a rectangular solid containing the point (x,y,z) is r=256$x_h$+1$y_h$+$z_h$. The index t ranges from 0 to 5, and is used to select a tetrahedron within a rectangular solid. The index of the tetrahedron within a rectangular solid. The index of the tetrahedron containing a point (x,y,z) may be calculated from the relationship t=I[256$x_1$+16$y_1$+$z_1$], where I is a tetrahedron index array to be described in further detail below. The index v ranges from 0 to 3, and is used to select one of the values needed to interpolate the tetrahedron identified by r and t. The values v=0, 1, and 2 select the elements of T, and the value v=3 selects t.

Figure 9A:
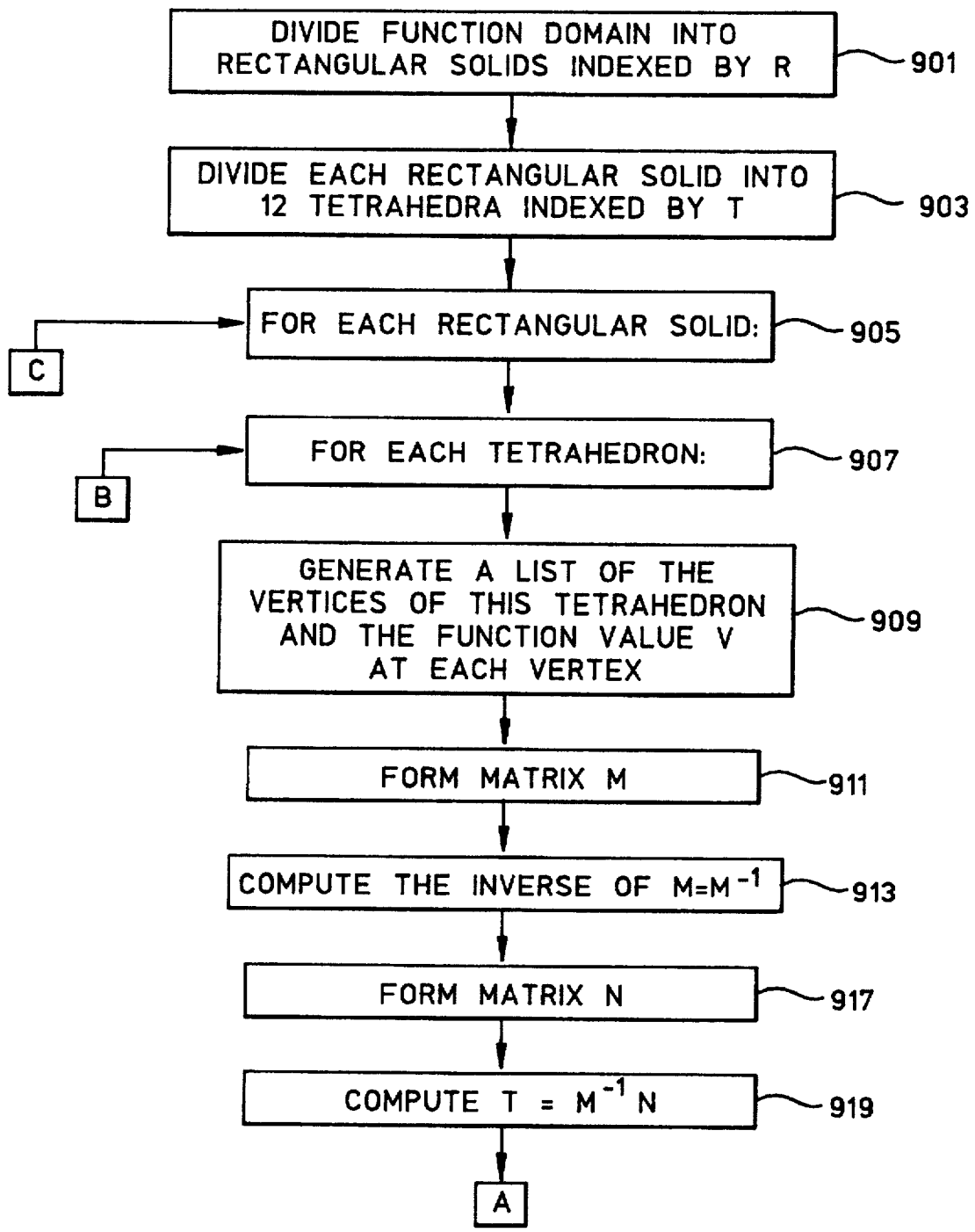
FIGS. 9A and 9B are a flowchart setting forth the operational sequences for implementing the tetrahedral linear interpolation of the present invention.
Figure 9B:
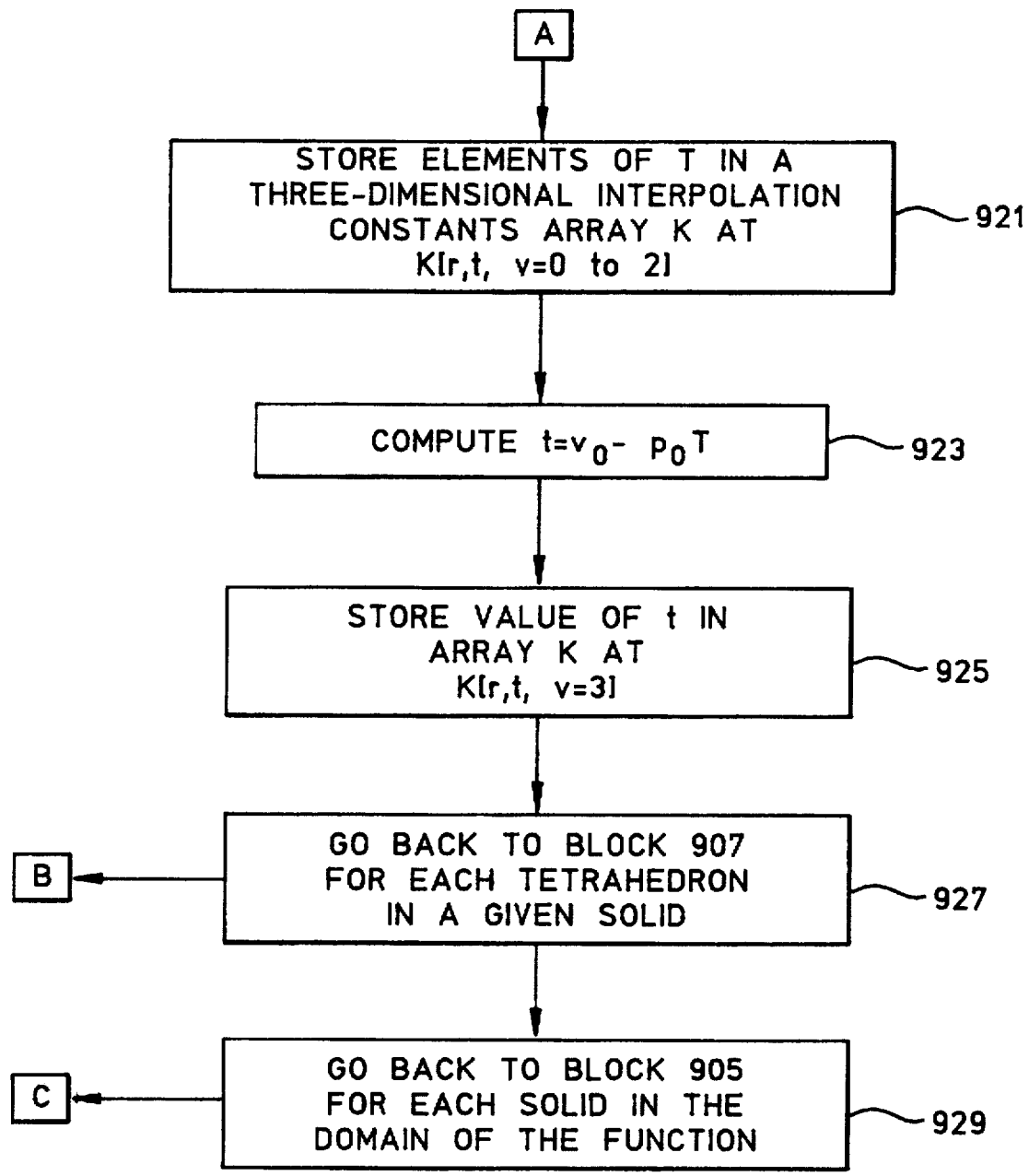

FIGS. 9A and 9B are a flowchart setting forth an embodiment of the linear interpolation phase of the invention, using the method described in conjunction with FIGS. 7A and 7B. The procedure illustrated in FIGS. 9A and 9B utilizes the tables for T and t which were prepared in accordance with the procedures of FIGS. 7A, 7B or 8. Referring now to FIG. 9A, the procedure commences at block 901, where the function domain is divided up into rectangular solids indexed by a variable r. This division was previously described in conjunction with FIG. 1. Next, at block 903, each rectangular solid is divided into 6 tetrahedra indexed by a variable t. These tetrahedra are similar to the geometrical structure discussed in conjunction with FIG. 3.

For each rectangular solid (block 905), and for each tetrahedron within a given solid (block 907), the following sequence of steps is performed. First, a list of the vertices of the tetrahedron under consideration is generated, and a function value v is determined for each of the vertices (block 909). Then, a matrix M is formed, consisting of the coordinates of each tetrahedron vertex. These coordinates represent sample points for a function f. This step was described in greater detail with reference to FIGS. 7A, 7B and 8. The matrix M is inverted at block 913, and a matrix N is formed at block 917 from the function values at each of the tetrahedra vertices. At block 919, the inverted matrix M is multiplied by matrix N to form matrix T.

The elements of matrix T are stored in a three-dimensional interpolation constants array K (block 921). The array K is indexed by means of three indices: r, t and v. In this manner, the array K may be stored in conventional random access memory devices by storing each element of T with the associated index values for r, t and v.

Figure 10:
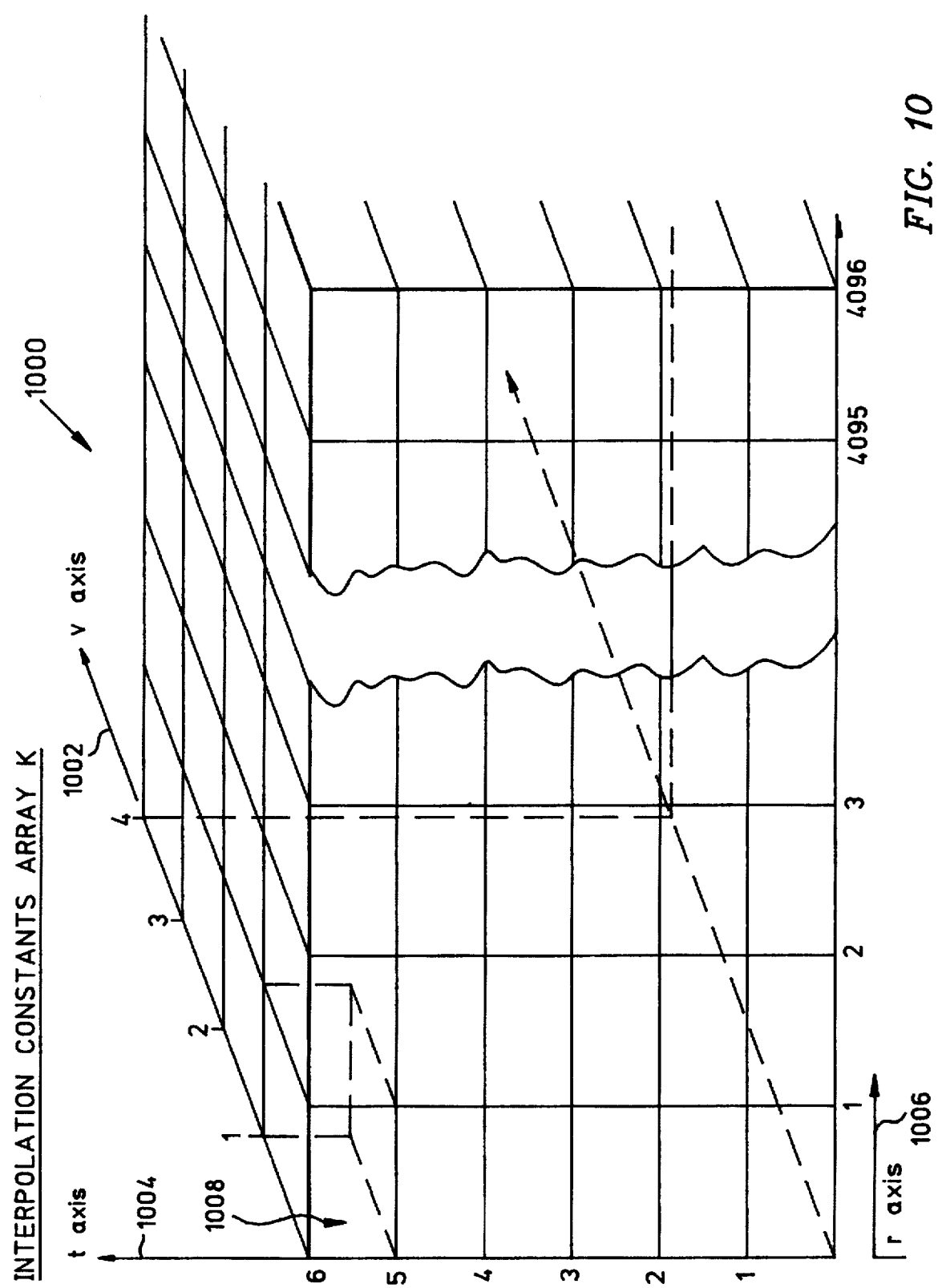
FIG. 10 is a three-dimensional diagram illustrating the data structures employed by the method of FIGS. 9A and 9B.

The data structure for the interpolation constants array 1000 is set forth in FIG. 10. The array 1000 is three-dimensional, consisting of a v axis 1002, a t axis 1004, and an r axis 1006. The r axis 1006 is used to specify the particular rectangular volume which contains a point arbitrarily selected from the function domain. As stated above, in the context of color image processing systems using 8-bit color value representations, the function domain is divided into 4096 rectangular volumes. The t axis 1004 specifies the tetrahedron within a given rectangular volume is sub divided into 6 tetrahedra, resulting in six array entries along the t dimension. The v axis 1002 specifies a particular element of T or t. Since each T calculated in accordance with the procedures of 7A, 7B and 8 includes three elements, and each t includes one element, there are four array entries in the v dimension.

Returning now to FIG. 9B, once the values of T are stored (block 921) in the interpolation constants array 1000 (FIG. 10), the array is filled for v index values from 0 to 2. The program progresses to block 923 where values for t are computed from the relationship $t=v_o-p_o \cdot r$. The values for t are stored in the interpolation constants array 1000 at a v index value of 3 (block 925). At block 927, the program loops back to block 905 for each rectangular solid in the domain of the function.

The interpolation constants array 1000 (FIG. 10) may be prepared by a computer program executed in a computer such as the computer 420 (FIG. 4) and having the following form:

```
For r=0 to 4095, do [
    For t=0 0-11, do [
        Generate a list of the varices of this
            tetrahedron and the function value
            at each vertex.
        Form the matrix M.
        Compute the inverse of M.
        Form the matrix N.
        Compute T=M⁻¹N
        Store the elements of T in K[r,t,0 ... 2]
```

-continued

```
        Compute t=v₀-p₀T
        Store the value of t in K[r,t,3]
    ] /* for all the tetrahedra in each solid*/
] /* for all the rectangular solids */
```

The index of the entry for the tetrahedron containing the point (x,y,z) is computed from the four low order bits of the three components $x_1$, $y_1$, $z_1$. Due to the fact that this is a complex computation, it is tabulated in an array termed the tetrahedron index array I. The array I is a linear array of 4096 entries. The entry for the point (x,y,z) may be addressed as $I[256x_1+16y_1+z_1]$.

The tetrahedron index array may be employed to compute an approximation. First, r is set to equal $256x_h+16y_h+z_h$. Then, t is set to equal $I[256x_1+16y_1+z_1]$. The approximation is computed as $f(x,y,z)=xK[r,t,0]+yK[r,t,1]+zK[r,t,2]+K[r,t,3]$. A computer program embodiment employing the tetrahedron index array to calculate an approximation is shown in Appendix A. This program is written in the C language.

A preferred embodiment of the invention operates in conjunction with a tabulated function. State of the art techniques for approximating the values of tabulated functions generally employ a function values table and the sample points for the rectangular solid domain divisions are saved in a linear array, F, having 4913 entries (17×17×17). The lower corner of the rectangular solid enclosing a selected point (x, y, z) are addressed using $F[289x_h+17y_h+z_h]$ where the index F ranges from 0 to 4912, $x=16x_h+x_1$, $y=16y_h+y_1$, and $z=16z_h+z_1$, and $z_h$ is the four high order bits of x, $x_1$ is the four low order bits of x, and similarly for y and z.

In addition to a function values table, prior art techniques for approximating tabulated functions require the use of a weights and vertices table. The weights and vertices table is an array of 4096 entries containing a structure for each element of the array. The array may be referred to as WandV for weights and vertices, and is addressed using WandV $[256x_1+16y_1+z_1]$, where the index of WandV is in the range of 0 to 4095. The WandV data structure contains the information for the point with offset $x_1,y_1,z_1$ within a rectangular solid. All points with this offset share the same properties. In this manner, the array need only be computed once, but may subsequently be used often as required to implement many approximations.

The data structure for each element of the WandV array contains the following eight items:

(1) the increment $0_1$, which is added to the value $289x_h+17y_h+z_h$ to obtain the index within F of the first sample point, a vertex of the tetrahedron;

(2) the increment $0_2$, which is added to the value $289x_h+17y_h+z_h$ to obtain the index within F of the second sample point, a vertex of the tetrahedron;

(3) the increment $0_3$, which is added to the value $289x_h+17y_h+z_h$ to obtain the index within F of the third sample point, a vertex of the tetrahedron;

(4) the increment $0_4$, which is added to the value $289x_h+17y_h+z_h$ to obtain the index within F of the fourth sample point, a vertex of the tetrahedron;

(5) the weight $W_1$ which is multiplied by the value $F289x_h+17y_h+z_h+0_1$ to obtain a portion of the final approximation (this value is equal to the volume of the tetrahedron formed using the target offset and the three sample points remaining after excluding the point by $0_1$, divided by the volume of the extracted tetrahedron);

(6) the weight $W_2$ which is multiplied by the value $F289x_h+17y_h+z_h+0_2$ to obtain a portion of the final approximation (this value is equal to the volume of the tetrahedron formed using the target offset and the three sample points remaining after excluding the point by $O_2$, divided by the volume of the extracted tetrahedron);

(7) the weight $W_3$ which is multiplied by the value $F289x_h+17y_h+z_h+O_3$ to obtain a portion of the final approximation (this value is equal to the volume of the tetrahedron formed using the target offset and the three sample points remaining after excluding the point by $O_3$, divided by the volume of the extracted tetrahedron); and (8) the weight $W_4$ which is multiplied by the value $F289x_h+17y_h+z_h+O_4$ to obtain a portion of the final approximation (this value is equal to the volume of the tetrahedron formed using the target offset and the three sample points remaining after excluding the point by $O_4$, divided by the volume of the extracted tetrahedron).

The existing prior art technique described above calculates the final approximation from the WandV array and the function values table as follows:

$$F(x,y,z) = \text{tempWandV}.W_1 \times F[\text{tempxyz} + \text{tempWandV}.O_1]$$
$$= \text{tempWandV}.W_2 \times F[\text{tempxyz} + \text{tempWandV}.O_2]$$
$$= \text{tempWandV}.W_3 \times F[\text{tempxyz} + \text{tempWandV}.O_3]$$
$$= \text{tempWandV}.W_4 \times F[\text{tempxyz} + \text{tempWandV}.O_4]$$

As compared with the existing prior art technique, the method of the present invention computes an approximation using fewer arithmetic operation. The invention uses n multiplications and n additions, as compared with the n+1 multiplications and n additions of the prior art technique. Consequently, the method of the invention requires fewer memory access operations. The invention retrieves n+1 values from the tetrahedral table $\tilde{T}$, compared with the n+1 weights and n+1 function values needed by the standard method. Furthermore, the invention required but 1 value from the tetrahedron indices array I to locate the correct set of constants, as compared with the n+1 required by the prior art technique.

The method of the invention provides more localized memory access operations relative to the prior art technique. The values from the tetrahedral table $\tilde{T}$ that the invention requires are all stored together, whereas the values accessed from the function table of the prior art technique may be widely scattered. One consequence of localized memory access is that, if a data cache is used, it will experience fewer misses. Although the prior art technique could be modified by storing the function values for each tetrahedron together, implementing this approach would require the use of much longer tables, thereby compromising the practical utility of these prior art techniques.

The tables of the invention are generally larger than tables used by prior art methods. In an implementation which subdivides the domain of the function argument into k intervals, the invention stores n+1 constants for each of $k^n$ rectangular solids. The prior art embodiment stores $(k+1)^n$ function values. Since each rectangle is divided into at least five tetrahedra, for reasonable values of k, the invention uses much more storage for the tetrahedral tables $\tilde{T}$ than the prior art scheme uses for the function values table.

Figure 11:
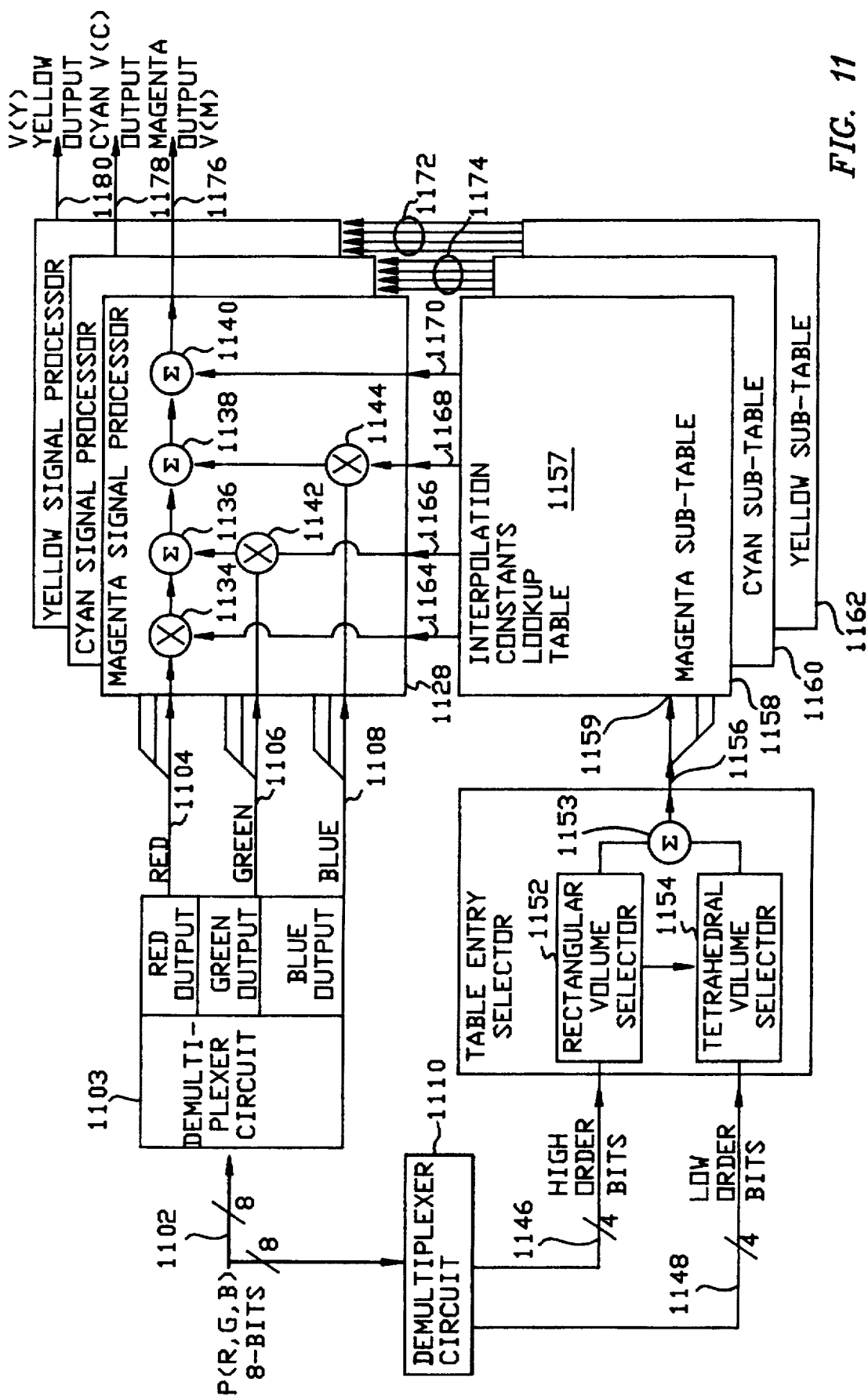
FIG. 11 is a functional block diagram showing an arithmetic apparatus for approximating a function value according to the invention.

FIG. 11 is a functional block diagram showing an arithmetic apparatus for approximating a function value according to a preferred embodiment of the invention. The invention accepts an input in input line 1102 in the form of one or more points P situated within the domain of RGB (red, green, blue) color space. The apparatus implements a series of operations to transform this input point into a point situated within the range of magenta, yellow, and cyan color space. The domain of RGB color space is divided into 4096 rectangular volumes (16×16×16), and each rectangular volume is further subdivided into six tetrahedra, as described in conjunction with FIGS. 1 and 2. The coordinates of the input point P are expressed in terms of RGB color space, such that, for example, the x coordinate denotes a value for red, the y coordinate denotes a value for green, and the z coordinate denotes a value for blue.

Upon receipt of a selected input point P at input line 1102 from within the domain of RGB color space, the coordinates of the selected point are fed to a first demultiplexer circuit 1103 which separates the input point P into red, green, and blue components. The input point P is represented in 8-bit notation, as was described earlier in conjunction with FIGS. 7A, 7B, and 8. The red 1104, green 1106, and blue 1108 outputs of the first demultiplexer circuit 1103 are fed to respective inputs of a magenta signal processor 1128. The magenta signal processor 1128 contains a network of summer circuits 1136, 1138, 1140, and multiplier circuits 1142 and 1144. The functioning of the magenta signal processor 1128 will be described more thoroughly hereinafter.

The coordinates of the selected point P are inputted to a second demultiplexer circuit 1110 over input line 1102. The second demultiplexer circuit 1110 divides the 8-bit input point P into four low order bits and four high order bits. The high order bits are conveyed to a rectangular volume selector 1152 and the low order bits are conveyed to a tetrahedral volume selector 1154. The rectangular volume selector 1152 and the tetrahedral volume selector 1154 together comprise a table entry selector 1150 which selects appropriate table entries from an interpolation constants lookup table 1157.

In the present example, the function domain has been divided up into rectangular volumes, and each rectangular volume has been further subdivided into six tetrahedra. The point P is represented in 8-bit notation, such that the four high order bits specify a given rectangular volume from within the function domain, and the four low order bits specify a particular tetrahedral volume within the given rectangular volume. Accordingly, the rectangular volume selector 1152 selects the rectangular volume from the input domain of RGB color space which includes the input point P. The rectangular volume selector 1152 develops the index into the interpolation constants lookup table 1157 of the first entry comprising a rectangular volume. The tetrahedral volume selector 1154 identifies the tetrahedron within the rectangular volume. The outputs of the selectors 1152 and 1154 are combined by an adder 1153, which produces an output signal. This output signal, specifying a single tetrahedral volume from within the RGB color space domain, is fed to an array index input 1159 of the interpolation constants lookup table 1157 over line 1156.

The interpolation constants lookup table 1157 accepts input values at the array index input 1159 which specify a given tetrahedral volume in the RGB color space domain. In this manner, every output signal from the table entry selector 1150 to the array index input 1159 results in the retrieval of values from the interpolation constants lookup table 1157 corresponding to four tetrahedron vertices. The coordinates of the vertices are expressed in terms of RGB color space, such that, for example, the x coordinate denotes a value for red, the y coordinate denotes a value for green, and the z coordinate denotes a value for blue. The coordinates of four vertices define a tetrahedral volume in RGB color space.

The interpolation constants lookup table 1157 associates each tetrahedral RGB color space volume with a corresponding set of four interpolation constants. Each set of four interpolation constants includes three multiplicative constants and one additive constant. Each interpolation constant contains three output components—magenta, yellow, and cyan. These output components may be separated and placed into individual sub-tables. In a preferred embodiment of the invention, the interpolation constants lookup table 1157 is organized into three sub-tables 1158, 1160, 1162. A magenta sub-table 1158 contains all of the magenta output components for the multiplicative and additive constants. Similarly, a yellow sub-table 1162 contains all of the yellow output components for the constants, and a cyan sub-table 1160 contains all of the cyan output components for the constants.

The magenta sub-table 1158 is coupled to the magenta signal processor 1128 over lines 1164, 1166, and 1170. Lines 1164, 1166, and 1168 convey the magenta output components of the multiplicative constants to the magenta signal processor 1128, and line 1170 conveys the magenta component of the additive constant to the magenta signal processor. In an analogous manner, four lines 1174 convey the cyan output components from the cyan sub-table 1160 to the cyan signal processor 1130, and four lines 1172 convey the yellow output components from the yellow sub-table 1162 to the yellow signal processor 1132.

The purpose of the magenta signal processor 1128 is to produce a magenta output signal on output line 1176. The magenta signal processor 1128 functions by applying the magenta output components from the magenta sub-table 1158 to the red 1104, green 1106, and blue 1108 outputs of the demultiplexer circuit 1103, using multipliers 1134, 1142, 1144, and summers 1136, 1138, 1140. Multiplier 1134 multiplies the red 1104 output by a first multiplicative constant from the magenta sub-table 1158 received on line 1164. Multiplier 1142 multiplies the green 1106 output by a second multiplicative constant from the magenta sub-table 1158 received on line 1166. The output of multiplier 1134 is added to the output of multiplier 1142 by summer 1136. Multiplier 1144 multiplies the blue 1108 output by a third multiplicative constant from the magenta sub-table 1158 received on line 1168. The output of summer 1136 is added to the output of multiplier 1144 by summer 1138. To the output of summer 1138, summer 1140 adds the additive constant from the magenta sub-table received over line 1170. The output of summer 1140 constitutes the magenta output 1176 produced by the magenta signal processor 1128. The signal processing steps required to produce yellow and cyan outputs are substantially identical to the steps described above in conjunction with the color magenta. Multiplication and addition steps analogous to those set forth above in respect to the magenta signal processor 1128 are performed by the cyan signal processor 1130 and the yellow signal processor 1132 to produce a cyan output 1178 and a yellow output 1180, respectively.

The multiplicative and additive constants stored in the interpolation constants lookup table 1157 are calculated using one of the table preparation processes previously described in conjunction with FIGS. 7A, 7B, and 8. These table preparation processes are described in greater detail in FIG. 12. The values in the interpolation constants lookup table 1157 reflect the results of empirical observations and measurements. The specific quantities of magenta, cyan and yellow inks are required to match the color of a domain sample value in RGB space is experimentally determined for various domain sample values. The experimental results serve to characterize the relationship between input domain points and range output values for a generally complicated mathematical function. The experimentally characterized function is then used to generate the interpolation constants which are to be placed into the table 1157. Empirical observations are conducted because the quantities of the inks required to match a predetermined color are generally dependent upon the specific type of paper used. For a given set of interpolation constants, different end results would be obtained, depending upon whether the print media consisted of, for example, newspaper sheets, typing paper, or colored stationary.

Figure 12A:
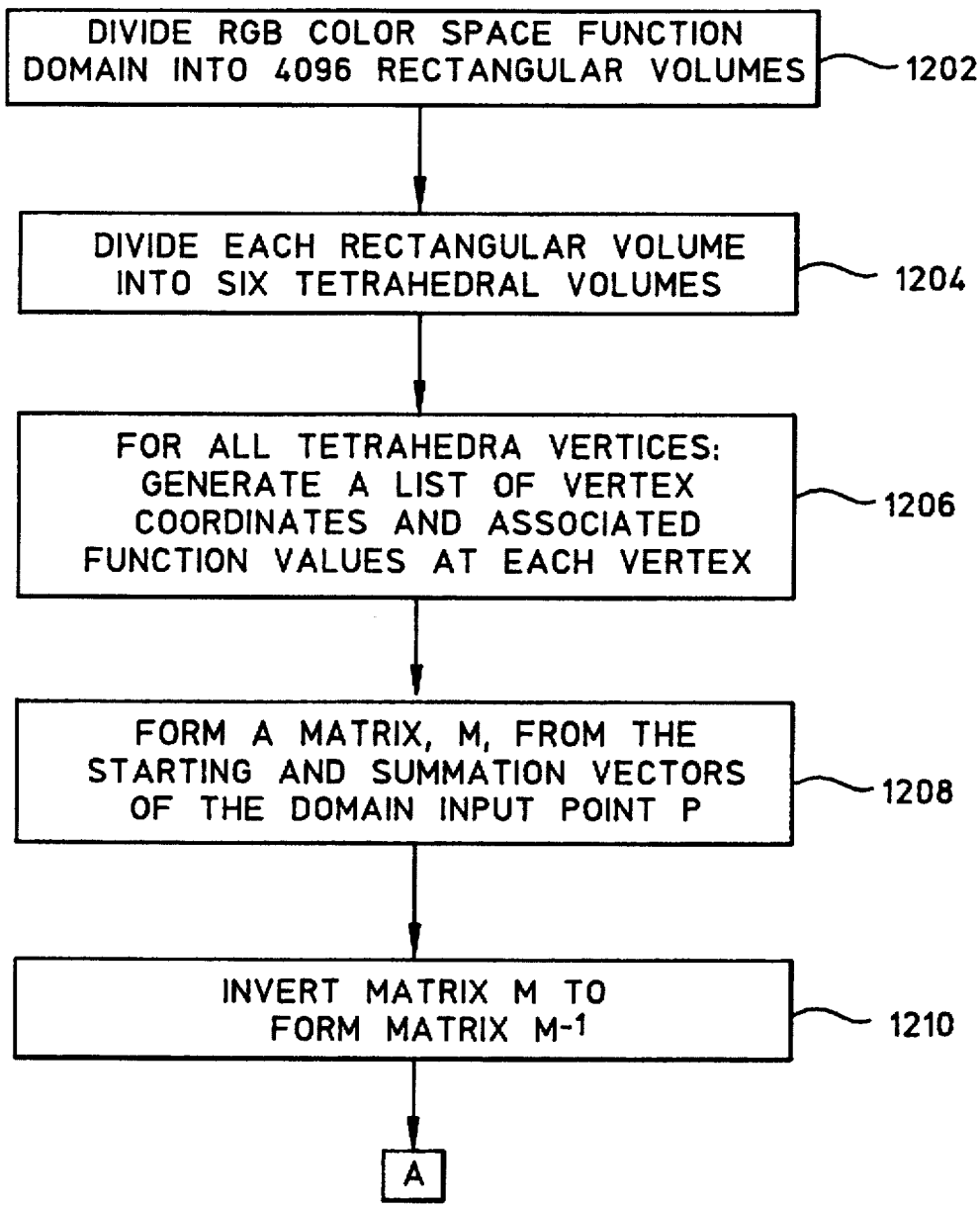
FIGS. 12A and 12B comprise a flowchart setting forth the operational sequences implemented by the arithmetic apparatus of FIG. 11.
Figure 12B:
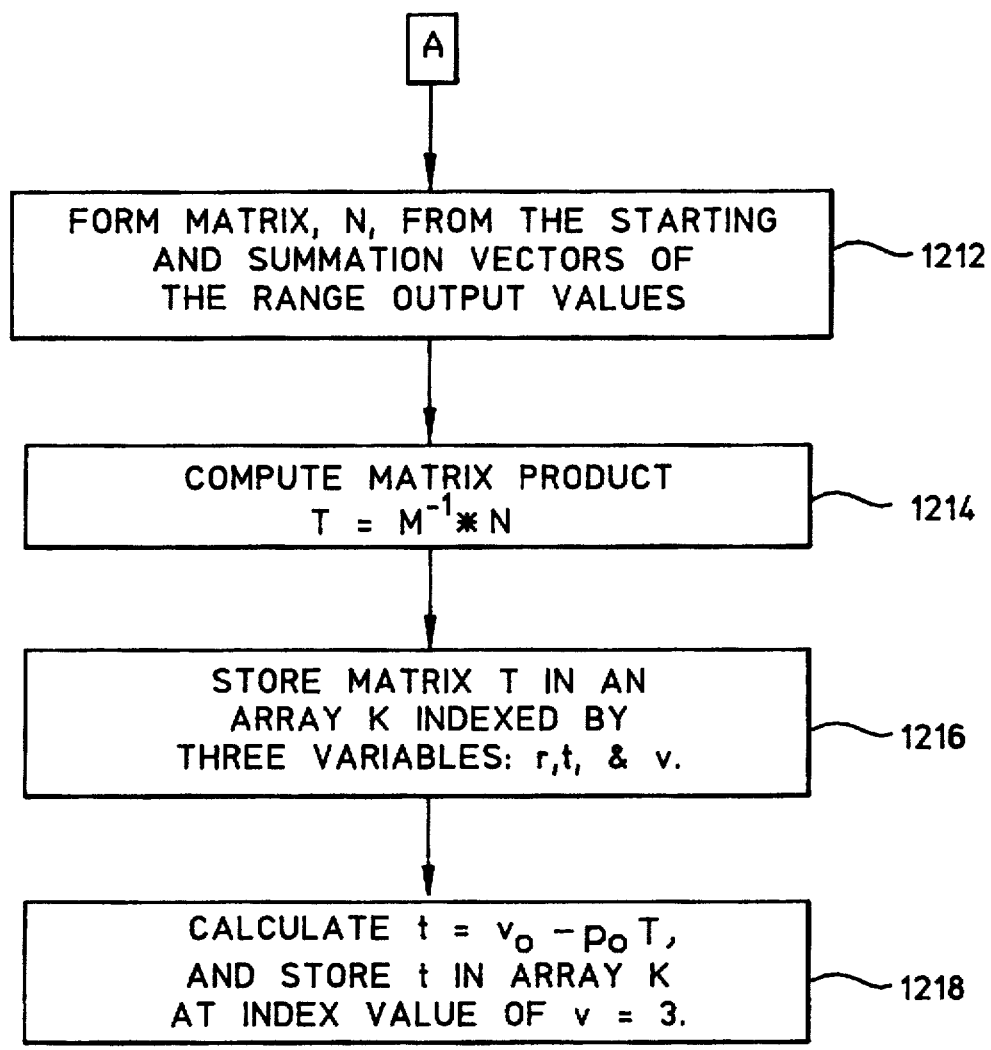

Referring now to FIGS. 12A and 12B, the RGB color space function domain is divided into 4096 rectangular volumes arranged in a 16×16×16 cube (block 1202), as shown in FIG. 1. A first corner of the cube is at the origin, and a second corner of the cube diagonal to the first corner is at the point red=16, green=16, blue=16. Each of the rectangular volumes is then divided into 6 tetrahedral volumes (block 1204). The corners of each cube and the vertices of each tetrahedra will be used as domain sample values.

After the preliminary steps of blocks 1202 and 1204 are completed, the relationship between the function input domain points and the function output range values must be ascertained at the domain sample values. In the context of the mathematical apparatus described in FIG. 11, the function has three domain input components n, which are red, green, and blue. The range output components of the function are magenta, cyan, and yellow. The red, green, and blue domain input components are conceptualized as a vector p, and the magenta, cyan, and yellow output components as a vector v. These vectors are each comprised of a starting vector and the sum of a sequential series of n summation vectors.

The vector v and the vector p are related by two tetrahedral interpolation variables denoted as vectors T and t. The mathematical relationship between v, p, T and t, is v=t+pT. In the present example where v is in MCY color space and p is in RGB color space, the relationship may be expressed as v(magenta, cyan, yellow)=t+p(red, green, blue)*(T). The components of the vector T constitute the multiplicative constants stored in the interpolation constants table 1130, whereas the components of the vector t constitute the additive constants stored in the interpolation constants lookup table 1157.

To calculate values for t and T, which are the additive and multiplicative constants, respectively, stored in the interpolation constants lookup table 1157, a list of the vertex coordinates for each tetrahedron is generated at block 1206. The list associates each tetrahedron coordinate with a function value corresponding to that coordinate. Next, at block 1208, a matrix M is formed from the starting and summation vectors of the domain input point p. The elements of the matrix M each represent the difference between a given component of two sequential summation vectors, or the difference between a given component of the starting vector and one of the summation vectors. The matrix M was described in greater detail in conjunction with FIGS. 6A–9B.

The matrix M is inverted at block 1210. This step is accomplished by methods which are well known in the art. For example, either standard Gaussian elimination or the determinants formula could be employed for this purpose. At block 1212, the matrix N is formed from the starting and summation vectors of the range output value v. The elements of the matrix N each represent the difference between a given component of two sequential summation vectors, or the difference between a given component of the starting vector and one of the summation vectors. The matrix N was described in greater detail conjunction with FIGS. 6A–9B.

The product of the matrices $M^{-1}$ and N is computed at block 1214. This operation produces a matrix containing the values for T. The elements of T are stored in an array K, which is indexed using three variables (block 1216). The indices are r, t, and v. The index r specifies a given rectangular solid, the index t specifies a given tetrahedron, and the index v indicates which one of the three components of T corresponding to a given tetrahedron and rectangular solid is specified. Therefore, the array K is indexed as K[r,t,0 . . . 2].

Once the valued of T have been computed, it is necessary to compute t. T is calculated at block 1218 from the mathematical relationship $t=v_o-p_oT$. The values of t are stored in the K array at a v index value of 3, where the values of r and t range over all tetrahedra and rectangular solids. The values of t are located at K[r,t,3]. The array K represents the interpolation constants lookup table. Values of t represent additive constants, values of T represent multiplicative constants.

Figure 13:
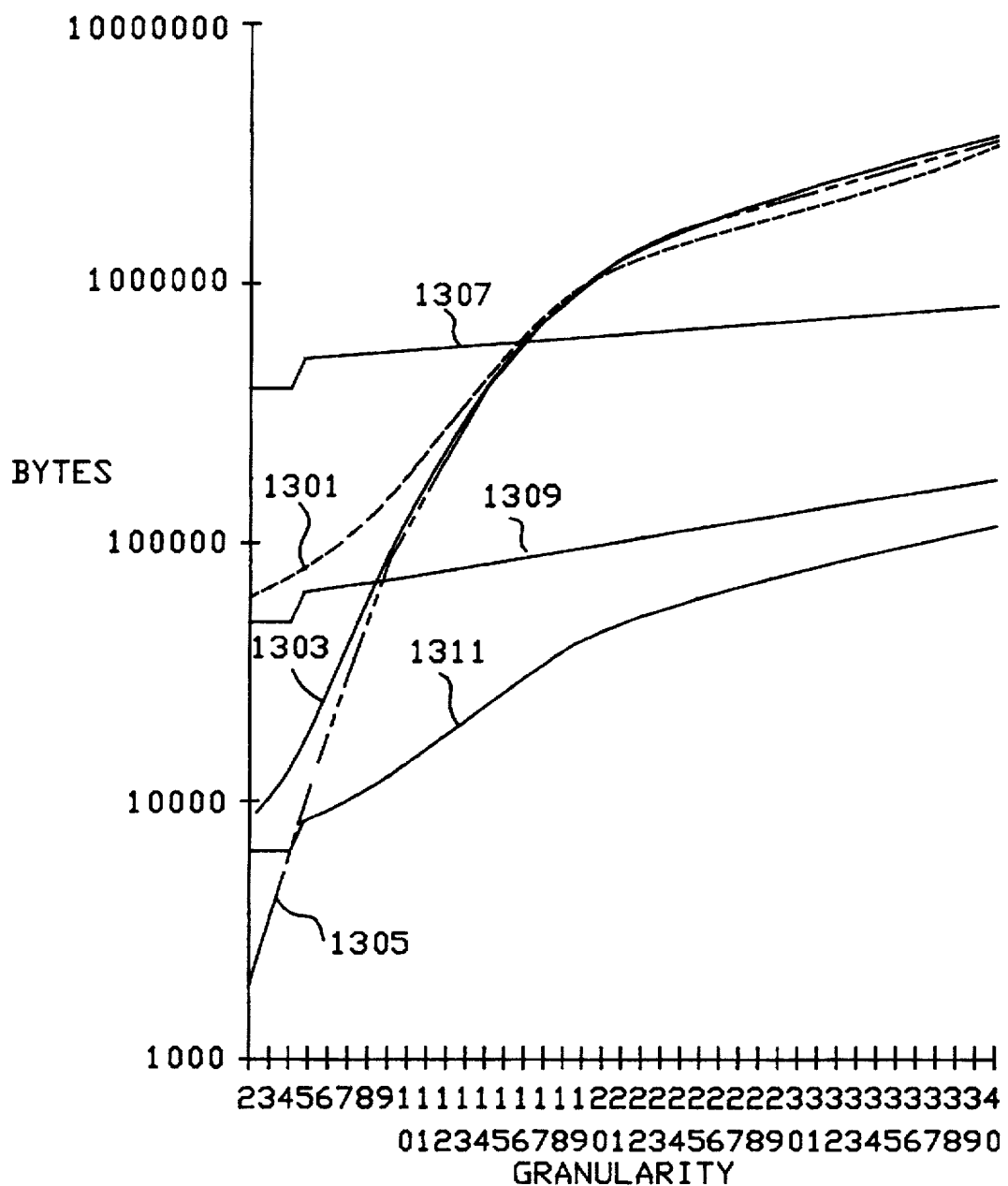
FIG. 13 is a graph showing memory usage versus granularity for various prior art interpolation techniques, and for the tetrahedral linear interpolation technique of the present invention.

FIG. 13 is a graph showing the relationship between granularity and storage space for the prior art technique and for the technique of the present invention. The graph was prepared using a scalar function of three variables, with the function domain divided up into 16 intervals in each dimension, 6 tetrahedra per rectangular solid, 16-bit function values, and 3, 4, and 5 bits in each dimension used to address points between samples. When 4 bits in each dimension are used to address points between samples, the invention consumes more storage once k exceeds about 10. When 3 bits are used, more storage is consumed for k exceeding 4, and when 5 bits are used, more storage is consumed for k exceeding about 20.

A number of specific embodiments of the invention have been described. Nevertheless, it will be understood that various modifications and changes may be made without departing from the spirit and scope of the invention. For example, the tetrahedral table $\tilde{T}$ constants may be calculated just before they are needed, rather than stored ahead of time. The constants may then be cached, either unconditionally or under the control of an algorithm that estimates their future usefulness compared to other cached values. A method other than table lookup may be employed to determine which tetrahedron contents to use in the interpolation phase of the method of the invention. For example, a literal, programmed implementation of the prior art technique could be employed. The n+1 points needed for interpolation using the invention may be selected by any suitable method. For example, a function domain may be divided and/or subdivided unequally. The unequal division can be implemented using automatic meshing techniques known to those skilled in the art. These meshing techniques are used to prepare data for analysis using the Finite Element Method of mathematical analysis, which is well known in the art. However, the requirement on any method is that the n+1 points define a non-degenerate n-dimensional polyhedron. Accordingly, it is to be understood that the invention is not to be limited by the specific illustrated embodiments, but only by the scope of the appended claims.

APPENDIX A

The following C function implements the invention in the context of function approximation:

```
int Interpolate(unsigned char *p)
{
    extern int InterpolationConstants[4096] [6] [4];
    extern int TetrahedronIndices[4096];
    int r, t, *T;
    int xL, yL, zL;
    int xH, yH, zH;
    /* Separate the low and high order bits of the components of p */
    xL = p[0] & 0x0F; yL = p[1] & 0x0F; zL = p[2] & 0x0F;
    xH = p[0] >> 4; yH = p[1] >> 4; zH = p[2] >> 4;
    /* Obtain a pointer to the interpolation constants for the tetrahedron
    containing the point p */
    r = (((xH << 4) + yH) << 4) + zH;
    t = TetrahedronIndices [(((xL << 4) + yL) << 4) + zL];
    T = InterpolationConstants [r] [t];
    /* Calculate the approximation and return the answer */
    return p[0] * T[0] + p[1] * T[1] + p[2] * T[2] + T[3];
}
```

I claim:

1. An arithmetic apparatus for converting an input color signal to an output color signal, said apparatus approximating a value v of a function having a domain input in a first three-dimensional color space and a range output in a second four-dimensional color space, the domain input being divided into a plurality of rectangular volumes, each said rectangular volume being further subdivided into a plurality of tetrahedra, each said tetrahedron having four vertices, vertices of each of the tetrahedra comprising sample domain input points p, each said sample domain input point p having a set of coordinates in the first color space, the apparatus comprising;

an input port to accept from an input device an input signal corresponding to an input image pixel of the input device, said input signal being represented by a set of coordinates for a domain input point P situated within the first three-dimensional color space, the point P having coordinates x, y, and z, such that x represents a first color component in the first three-dimensional color space, y represents a second color component in the first three-dimensional color space, and z represents a third color component in the first three-dimensional color space;

a first demultiplexer for separating the domain input point P into a demultiplexed output comprising first, second and third color components;

a memory containing a tetrahedral interpolation constants table, said table including:

the domain input divided into a plurality of tetrahedral volumes, each tetrahedral volume having four vertices i, each vertex i having vertex coordinates x(i,j) in the first three-dimensional color space and an associated range output value v at the vertex i of v(i,k);

a matrix T comprising the inverse of an n×n matrix X multiplied by an n×m matrix V; wherein matrix X comprises matrix components X(i,j) defined as X(i, j)=x(i+1,j)−x(0,j) for 0≦j≦n−1 and 0≦j≦m−1, and wherein matrix V comprises matrix components V(i,k) defined as V(i,k)=v(i+1,k)−v(0,k) for 0≦i≦n−1 and 0≦k≦m−1;

a vector t comprising vector components t(k) wherein t(k)=v(0,k)−x(0,k)*T for 0≦k≦m−1;

wherein the tetrahedral interpolation constants table is structured to map between each tetrahedra vertex and first, second, and third multiplicative constants that comprise corresponding components of the matrix T, and to also map between each tetrahedra vertex and an additive constant comprising a corresponding component of the vector t, wherein each constant includes first, second, and third color components;

a selector coupled to the input port and the memory for selecting the tetrahedron containing the point p; and a signal processor coupled to the memory and to the demultiplexer output for producing an output signal corresponding to an image pixel of an output device and represented by an output signal value v in the second four-dimensional color space, the output signal value v having a first color constituent a, a second color constituted b, a third color constituent c, and a fourth color constituent d; the signal processor including first signal processor associated with the first color component for producing a first color output representative of the first color constituent a, a second signal processor associated with the second color component for producing a second color output representative of the second color constituent b, a third signal processor associated with the third color component for producing a third color output representative of the third color constituent c, and a fourth signal processor for producing a forth color output, representative of the fourth color constituent; each of the first, second, third and fourth signal processor means including:

(i) first multiplication means for producing a first product by multiplying the first component of the demultiplexer output by a corresponding component of the first multiplicative constant;

(ii) second multiplication means for producing a second product by multiplying the second component of the demultiplexer output by a corresponding component of the second multiplicative constant;

(iii) third multiplication means for producing a third product by multiplying the third component of the demultiplexer output by a corresponding component of the third multiplicative constant;

(iv) first summing means for producing a first sum by adding the first product to the second product;

(v) second summing means for producing a second sum by adding the first sum to the third product;

(vi) third summing means for producing a third sum by adding the second sum to a corresponding component of the additive constant; the third sum comprising a color output for the respective color constituent;

wherein the set of coordinates for the selected domain input point p is expressed as an 8 bit number having four high order bits and four low order bits, the four high order bits indicating a particular one of said plurality of rectangular volumes which includes the selected domain input point p, the four low order bits indicating a particular one of said plurality of tetrahedral volumes which includes the selected domain input point p; the arithmetic apparatus further including a second demultiplexer, having a second demultiplexer input and a second demultiplexer output, to separate a domain input point p at the second demultiplexer input into four low order bits and four high order bits at the second demultiplexer output, the second demultiplexer input being coupled to the input port, the second demultiplexer output being coupled to the selector, the selector further including:

(i) rectangular volume selector responsive to the four high order bits to select the particular one of said plurality of rectangular volumes; and (ii) tetrahedral volume selector responsive to the four low order bits to select the particular one of said plurality of tetrahedral volumes.

2. An arithmetic apparatus for converting an input color signal to an output color signal, said apparatus approximating a value v of a function having a domain input in a first three-dimensional color spaces and a range output in a second three-dimensional color space the domain input being divided into a plurality of rectangular volumes, each said rectangular volume being further subdivided into a plurality of tetrahedra, each said tetrahedron having four vertices, vertices of each of the tetrahedra comprising sample domain input points p, each said sample domain input point p having a set of coordinates in the first color space, the apparatus comprising:

an input port to accept from an input device an input signal corresponding to an input image pixel of the input device, said input signal being represented by a set of coordinates for a domain input point P situated within the first three-dimensional color space, the point P having coordinates x, y and z, such that x represents a first color component in the first three-dimensional color space, y represents a second color component in the first three-dimensional color space, and z represents a third color component in the first three-dimensional color space;

a first demultiplexer for separating the domain input point P into a demultiplexed output comprising first, second and third color components;

a memory containing a tetrahedral interpolation constants table, said table including:

the domain input, divided into a plurality of tetrahedral volumes, each tetrahedral volume having four vertices i, each vertex i having vertex coordinates x(i,j) in the first three-dimensional color space and an associated range output value v at the vertex i of v(i,k);

a matrix T equal to the inverse an n×n matrix X multiplied by an n×m matrix V; wherein matrix X comprises matrix components X(i,j) defined as X(i, j)=x(i+1,j)−x(0,j) for $0 \leq i \leq n-1$ and $0 \leq j \leq m-1$, and wherein matrix V comprises matrix components V(i,k) defined as V(i,k)=v(i+1,k)−v(0,k) for $0 \leq i \leq n-1$ and $0 \leq k \leq m-1$;

a vector t comprising vector components t(k) wherein t(k)=v(0,k)*T for $0 \leq k \leq m-1$; and;

wherein the tetrahedral interpolation constants table is structured to map between each tetrahedra vertex first, second, and third multiplicative constants that comprise corresponding components of the matrix T, and to also map between each tetrahedra vertex and an additive constant comprising a corresponding component of the vector t, wherein each constant includes first, second, and third color components;

a selector coupled to the input port and the memory for selecting the tetrahedron containing the selected point p;

a signal processor coupled to the memory and to the demultiplexer output for producing an output signal corresponding to an image pixel of an output device and represented by an output signal value v in the second three-dimensional color space, the output signal value v having a first color constituent a, a second color constituent b, and a third color constituent c; the signal processor including first signal processor associated with the first color component for producing a first color output representative of the first color constituent a, a second signal processor associated with the second color component for producing a second color output representative of the second color constituent b, and third signal processor associated with the third color component for producing a third color output representative of the third color constituent c; each of the first, second and third signal processors including:

(i) first multiplication means for producing a first product by multiplying the first component of the demultiplexer output by a corresponding component of the first multiplicative constant;

(ii) second multiplication means for producing a second product by multiplying the second component of the demultiplexer output by a corresponding component of the second multiplicative constant;

(iii) third multiplication means for producing a third product by multiplying the third component of the demultiplexer output by a corresponding component of the third multiplicative constant;

(iv) first summing means for producing a first sum by adding the first product to the second product;

(v) second summing means for producing a second sum by adding the first sum to the third product; and (vi) third summing means for producing a third sum by adding the second sum to a corresponding component of the additive constant; the third sum comprising a color output for the respective color constituent;

wherein the set of coordinates for the selected domain input point p is expressed as an 8 bit number having four high order bits and four low order bits, the four high order bits indicating a particular one of said plurality of rectangular volumes which includes the selected domain input point p, the four low order bits indicating a particular one of said plurality of tetrahedral volumes which includes the selected domain input point p; the arithmetic apparatus further including a second demultiplexer, having a second demultiplexer input and a second demultiplexer output, to separate a domain input point p at the second demultiplexer input into four low order bits and four high order bits at the second demultiplexer output, the second demultiplexer input being coupled to the input port, the second demultiplexer output being coupled to the selector, the selector further including:

(i) rectangular volume selector responsive to the four high order bits to select the particular one of said plurality of rectangular volumes; and (ii) tetrahedral volume selector responsive to the four low order bits to select the particular one of said plurality of tetrahedral volumes.

* * * * *